(12) United States Patent
Buchanan et al.

(10) Patent No.: US 7,475,040 B2
(45) Date of Patent: Jan. 6, 2009

(54) RETURN ITEM EARLY NOTIFICATION AND RETURN

(75) Inventors: Danne Buchanan, Sandy, UT (US); William Ronald Titus, Fruit Heights, UT (US)

(73) Assignee: Netdeposit, Inc., Salt Lake City, UT (US)

( * ) Notice: Subject to any disclaimer, the term of this patent is extended or adjusted under 35 U.S.C. 154(b) by 356 days.

(21) Appl. No.: 10/265,779

(22) Filed: Oct. 8, 2002

(65) Prior Publication Data

US 2004/0068464 A1 Apr. 8, 2004

Related U.S. Application Data

(63) Continuation-in-part of application No. 09/560,779, filed on Apr. 28, 2000, now Pat. No. 7,181,430, and a continuation-in-part of application No. 09/676,956, filed on Oct. 2, 2000, now Pat. No. 7,216,106, which is a continuation-in-part of application No. 09/560,779, filed on Apr. 28, 2000, now Pat. No. 7,181,430.

(51) Int. Cl.
*G06Q 40/00* (2006.01)

(52) U.S. Cl. .................... 705/42; 705/40; 705/41; 705/43; 705/44; 705/45

(58) Field of Classification Search ............... 705/35, 705/38–45, 16–18; 235/379–381
See application file for complete search history.

(56) References Cited

U.S. PATENT DOCUMENTS 4,027,142 A * 5/1977 Paup et al. ............... 235/379
4,126,779 A    11/1978 Jowers et al.
4,201,978 A     5/1980 Nally
4,264,808 A     4/1981 Owens et al.
4,321,672 A     3/1982 Braun et al.

(Continued)

FOREIGN PATENT DOCUMENTS

CA        2131667 A1    9/1994

(Continued)

OTHER PUBLICATIONS

Unknown, TDB-ACC-No. NN9104328 published on Apr. 1, 1991, Integrated automatic coin banking system, IBM Technical Disclosure Bulletin, vol. 33, issue 11, pp. 329-329.*

(Continued)

*Primary Examiner*—James P Trammell
*Assistant Examiner*—Daniel L Greene
(74) *Attorney, Agent, or Firm*—Foley & Lardner LLP

(57) ABSTRACT

A method, and system for processing electronic return items, the method comprising: receiving directly or indirectly from a plurality of different payor banks a plurality of different electronic return notification files, each electronic return notification file in the plurality for a different bank of first deposit, each electronic return notification file including a data structure with a designated bank of first deposit, an amount, and a reference key for the return item and a return reason; sorting multiple electronic return notification files by designated bank of first deposit; and sending each of a plurality of the electronic return notification files directly or indirectly to its respective designated bank of first deposit.

20 Claims, 17 Drawing Sheets

U.S. PATENT DOCUMENTS

| | | | |
|---|---|---|---|
| 4,326,258 A | 4/1982 | de la Guardia | |
| 4,358,671 A | 11/1982 | Case | |
| 4,417,136 A | 11/1983 | Rushby et al. | |
| 4,454,575 A | 6/1984 | Bushaw et al. | |
| 4,457,015 A | 6/1984 | Nally et al. | |
| RE31,692 E | 10/1984 | Tyburski et al. | |
| 4,500,750 A | 2/1985 | Elander et al. | |
| 4,523,330 A | 6/1985 | Cain | |
| 4,555,617 A | 11/1985 | Brooks et al. | |
| 4,578,530 A | 3/1986 | Zeidler | |
| 4,602,936 A | 7/1986 | Topfl et al. | |
| 4,650,978 A | 3/1987 | Hudson et al. | |
| 4,680,803 A | 7/1987 | Dilella | |
| 4,694,147 A | 9/1987 | Amemiya et al. | |
| 4,730,767 A * | 3/1988 | Gendron | 229/305 |
| 4,731,524 A * | 3/1988 | Brooks | 235/432 |
| 4,750,201 A | 6/1988 | Hodgson et al. | |
| 4,843,220 A | 6/1989 | Haun | |
| 4,858,121 A | 8/1989 | Barber et al. | |
| 4,888,812 A | 12/1989 | Dinan et al. | |
| 4,912,762 A | 3/1990 | Lee et al. | |
| 4,926,325 A | 5/1990 | Benton et al. | |
| 4,948,174 A * | 8/1990 | Thomson et al. | 283/58 |
| 4,960,981 A | 10/1990 | Benton et al. | |
| 4,974,878 A * | 12/1990 | Josephson | 283/67 |
| 5,053,607 A | 10/1991 | Carlson et al. | |
| 5,054,096 A | 10/1991 | Beizer | |
| 5,091,968 A | 2/1992 | Higgins et al. | |
| 5,121,945 A | 6/1992 | Thomson et al. | |
| 5,122,950 A | 6/1992 | Benton et al. | |
| 5,144,115 A | 9/1992 | Yoshida | |
| 5,159,548 A | 10/1992 | Caslavka | |
| 5,168,444 A | 12/1992 | Cukor et al. | |
| 5,175,682 A | 12/1992 | Higashiyama et al. | |
| 5,200,993 A | 4/1993 | Wheeler et al. | |
| 5,229,764 A | 7/1993 | Matchett et al. | |
| 5,237,158 A | 8/1993 | Kern et al. | |
| 5,237,159 A * | 8/1993 | Stephens et al. | 705/30 |
| 5,265,007 A | 11/1993 | Barnhard, Jr. et al. | |
| 5,274,567 A | 12/1993 | Kallin et al. | |
| 5,321,816 A | 6/1994 | Rogan et al. | |
| 5,324,922 A | 6/1994 | Roberts | |
| 5,326,959 A | 7/1994 | Perazza | |
| 5,373,550 A | 12/1994 | Campbell et al. | |
| 5,384,835 A | 1/1995 | Wheeler et al. | |
| 5,412,190 A | 5/1995 | Josephson et al. | |
| 5,425,080 A | 6/1995 | Abbie | |
| 5,438,184 A | 8/1995 | Roberts et al. | |
| 5,444,779 A | 8/1995 | Daniele | |
| 5,444,794 A | 8/1995 | Uhland, Sr. | |
| 5,453,601 A | 9/1995 | Rosen | |
| 5,473,143 A | 12/1995 | Vak et al. | |
| 5,484,988 A | 1/1996 | Hills et al. | |
| 5,488,671 A | 1/1996 | Kern | |
| 5,504,822 A | 4/1996 | Holt | |
| 5,506,691 A | 4/1996 | Bednar et al. | |
| 5,528,705 A | 6/1996 | Reasoner, Jr. et al. | |
| 5,528,765 A | 6/1996 | Milligan | |
| 5,532,464 A * | 7/1996 | Josephson et al. | 235/379 |
| 5,544,255 A | 8/1996 | Smithies et al. | |
| 5,546,471 A | 8/1996 | Merjanian | |
| 5,583,759 A | 12/1996 | Geer | |
| 5,613,012 A | 3/1997 | Hoffman et al. | |
| 5,615,277 A | 3/1997 | Hoffman | |
| 5,619,524 A | 4/1997 | Ling et al. | |
| 5,664,111 A | 9/1997 | Nahan et al. | |
| 5,668,897 A * | 9/1997 | Stolfo | 382/283 |
| 5,673,333 A | 9/1997 | Johnston | |
| 5,677,955 A | 10/1997 | Doggett et al. | |
| 5,678,046 A | 10/1997 | Cahill et al. | |
| 5,679,938 A | 10/1997 | Templeton et al. | |
| 5,684,965 A | 11/1997 | Pickering | |
| 5,689,579 A | 11/1997 | Josephson | |
| 5,691,524 A | 11/1997 | Josephson | |
| 5,708,810 A | 1/1998 | Kern et al. | |
| 5,717,868 A | 2/1998 | James | |
| 5,760,916 A | 6/1998 | Dellert et al. | |
| 5,783,808 A | 7/1998 | Josephson | |
| 5,784,610 A | 7/1998 | Copeland, III et al. | |
| 5,787,403 A | 7/1998 | Randle | |
| 5,787,405 A | 7/1998 | Gregory | |
| 5,793,302 A | 8/1998 | Stambler | |
| 5,802,498 A * | 9/1998 | Comesanas | 705/34 |
| 5,819,236 A * | 10/1998 | Josephson | 705/35 |
| 5,832,463 A | 11/1998 | Funk | |
| 5,832,464 A | 11/1998 | Houvener et al. | |
| 5,864,871 A | 1/1999 | Kitain et al. | |
| 5,870,725 A | 2/1999 | Bellinger et al. | |
| 5,889,863 A | 3/1999 | Weber | |
| 5,890,141 A | 3/1999 | Carney et al. | |
| 5,893,078 A | 4/1999 | Paulson | |
| 5,895,453 A | 4/1999 | Cook | |
| 5,895,455 A | 4/1999 | Bellinger et al. | |
| 5,897,625 A | 4/1999 | Gustin et al. | |
| 5,904,844 A * | 5/1999 | Stone | 210/232 |
| 5,910,988 A * | 6/1999 | Ballard | 705/75 |
| 5,917,965 A | 6/1999 | Cahill et al. | |
| 5,930,778 A | 7/1999 | Geer | |
| 5,936,541 A | 8/1999 | Stambler | |
| 5,940,813 A | 8/1999 | Hutchings | |
| 5,940,844 A | 8/1999 | Cahill et al. | |
| 5,953,702 A | 9/1999 | Ohlemacher et al. | |
| 5,963,647 A | 10/1999 | Downing et al. | |
| 5,963,659 A | 10/1999 | Cahill et al. | |
| 5,974,148 A | 10/1999 | Stambler | |
| 5,978,840 A | 11/1999 | Nguyen et al. | |
| 5,999,624 A | 12/1999 | Hopkins | |
| 6,019,282 A * | 2/2000 | Thompson et al. | 235/379 |
| 6,021,202 A * | 2/2000 | Anderson et al. | 705/54 |
| 6,029,172 A * | 2/2000 | Jorna et al. | 707/102 |
| 6,032,137 A * | 2/2000 | Ballard | 705/75 |
| 6,036,344 A | 3/2000 | Goldenberg | |
| 6,038,553 A | 3/2000 | Hyde, Jr. | |
| 6,045,039 A | 4/2000 | Stinson et al. | |
| 6,105,011 A | 8/2000 | Morrison, Jr. | |
| 6,108,104 A | 8/2000 | Tesavis | |
| 6,112,902 A | 9/2000 | Hayduchok et al. | |
| 6,115,509 A | 9/2000 | Yeskel | |
| 6,138,107 A | 10/2000 | Elgamal | |
| 6,164,528 A | 12/2000 | Hills et al. | |
| 6,178,409 B1 | 1/2001 | Weber et al. | |
| 6,181,837 B1 * | 1/2001 | Cahill et al. | 382/305 |
| 6,189,785 B1 * | 2/2001 | Lowery | 235/379 |
| 6,202,055 B1 | 3/2001 | Houvener et al. | |
| 6,257,783 B1 | 7/2001 | Hanaoka et al. | |
| 6,289,322 B1 | 9/2001 | Kitchen et al. | |
| 6,301,379 B1 | 10/2001 | Thompson et al. | |
| 6,363,164 B1 | 3/2002 | Jones et al. | |
| 7,181,430 B1 | 2/2007 | Buchanan et al. | |
| 2002/0001393 A1 | 1/2002 | Jones et al. | |
| 2002/0152170 A1 | 10/2002 | Dutta et al. | |
| 2003/0009420 A1 | 1/2003 | Jones | |
| 2003/0023557 A1 | 1/2003 | Moore | |
| 2003/0033252 A1 | 2/2003 | Buttridge et al. | |
| 2003/0050889 A1 | 3/2003 | Burke | |

FOREIGN PATENT DOCUMENTS

| | | | |
|---|---|---|---|
| EP | 0 661 654 A2 | 11/1994 | |
| JP | 10187861 A * | 7/1998 | |
| JP | 11272763 A * | 10/1999 | |
| WO | WO 97/22060 A1 | 12/1996 | |

| | | |
|---|---|---|
| WO | WO 97/36254 | 10/1997 |

OTHER PUBLICATIONS

Unknown, Transaction completion code based on digital signature, TDB-ACC-No. NN85081109, Aug. 1, 1985, vol. 28, issue 3, pp. 1109-1122.*

Josephson, Electronic cheque processing method for bank—involves transmitting return notification relating to list of potentially returnable cheques from payer bank to presenting bank. DERWENT-ACC-No. 1998-427151, published on Jul. 21, 1998.*

"Preliminary Invalidity Contentions of Defendants", *United States District Court for the Eastern District of Texas Texarkana Division, Civil Action No. 5:02cv124*. Dec. 3, 2002, pp. 1-20.

Jeanne Bahnke et al., "NSSDC's Mass Storage System Evolves", Mar. 1995, pp. 1 and 2, vol. 11, No. 1., Dec. 2, 2002, http://nssdc.gsfc.nasa.gov/nssdc_news/march95/09_i_behnke0395.html.

"Program Product", *Electronic Payment Systems Support/check Processing Control System: Program Reference and Operational Manual*, $8^{th}$ ed., Jun. 1986, International Business Machines Corporation.

"IBM 3898 Image Processor", *U.S. Marketing & Services*, Mar. 13, 1990.

Lucent Technologies, "Cisco partners with AT&T CMS on network switch manufacturing", Sep. 26, 1995, Dec. 2, 2002, http://www.lucent.com/ress/0995/950926.mma.html.

"At Your Service", *A Newsletter from the Federal Reserve Bank of Kansas City, Special Ed.*, Summer 1995. Kansas City.

American Bankers Association, *American National Standard For Financial Image Interchange: Architecture, Overview and System Design Specification*, 1994, American National Standards Institute, Inc.

Robert J. Brown, ANSI X9.46 Data Structure Reference; Jul. 31, 1995, pp. 4-16.

* cited by examiner

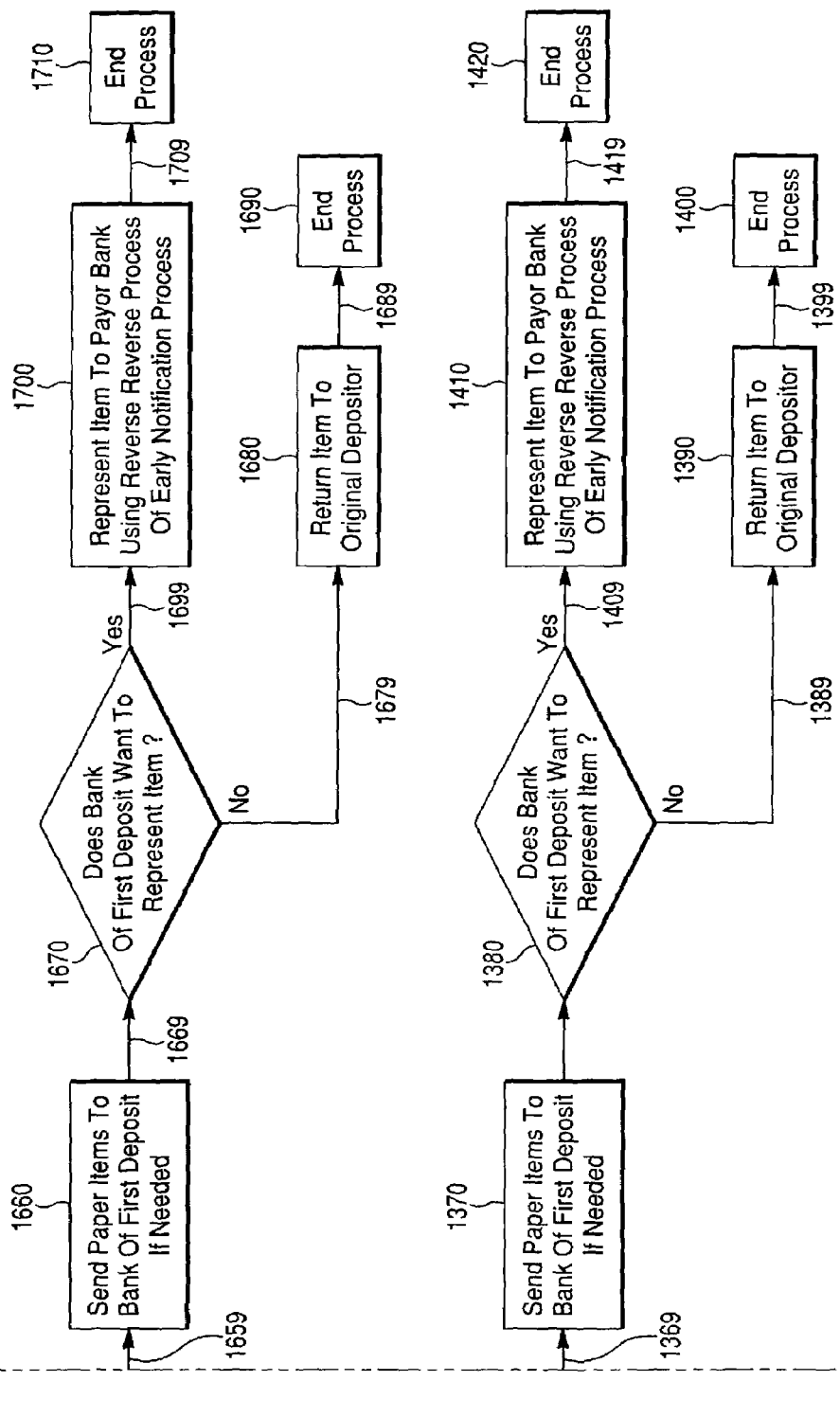

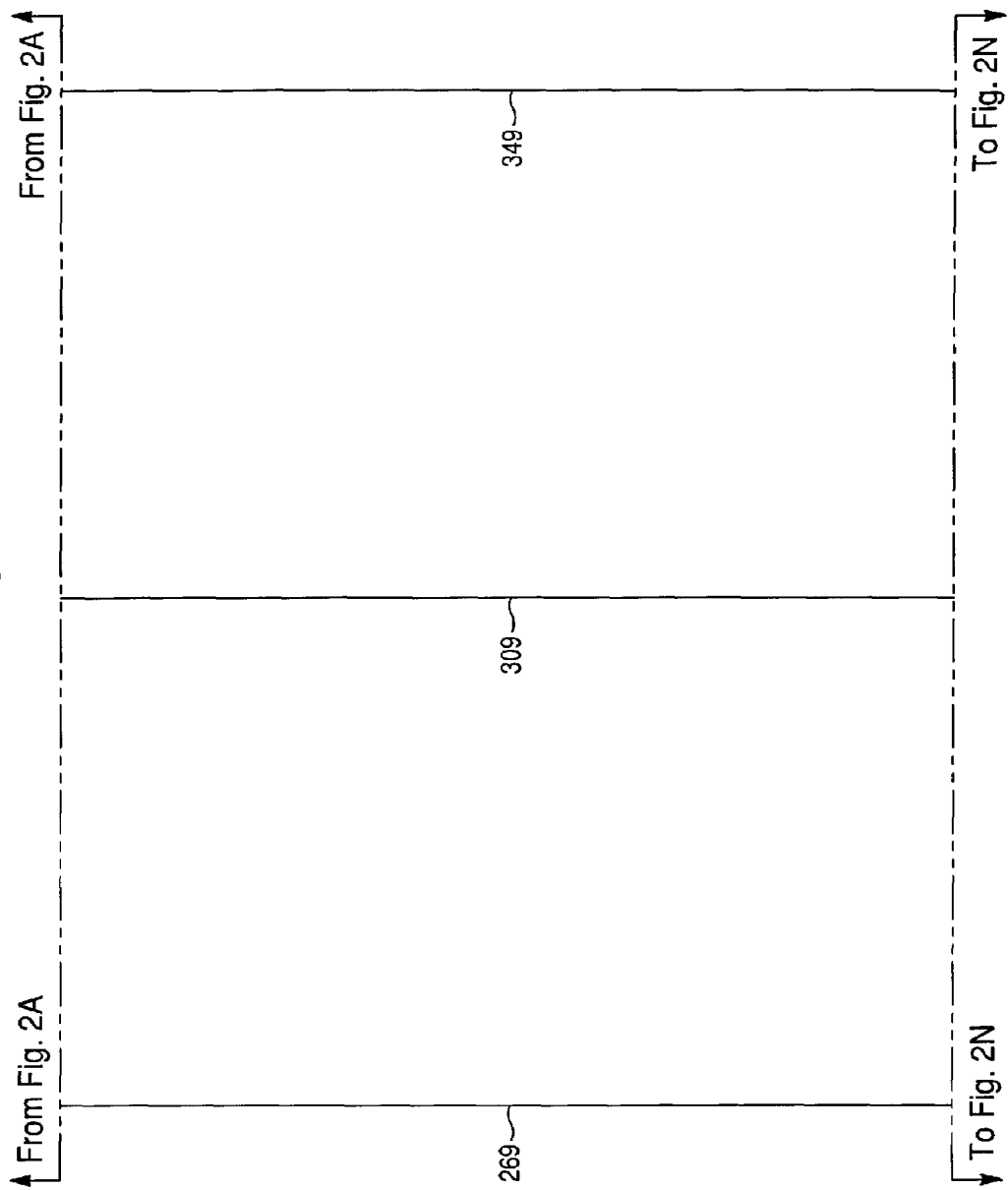

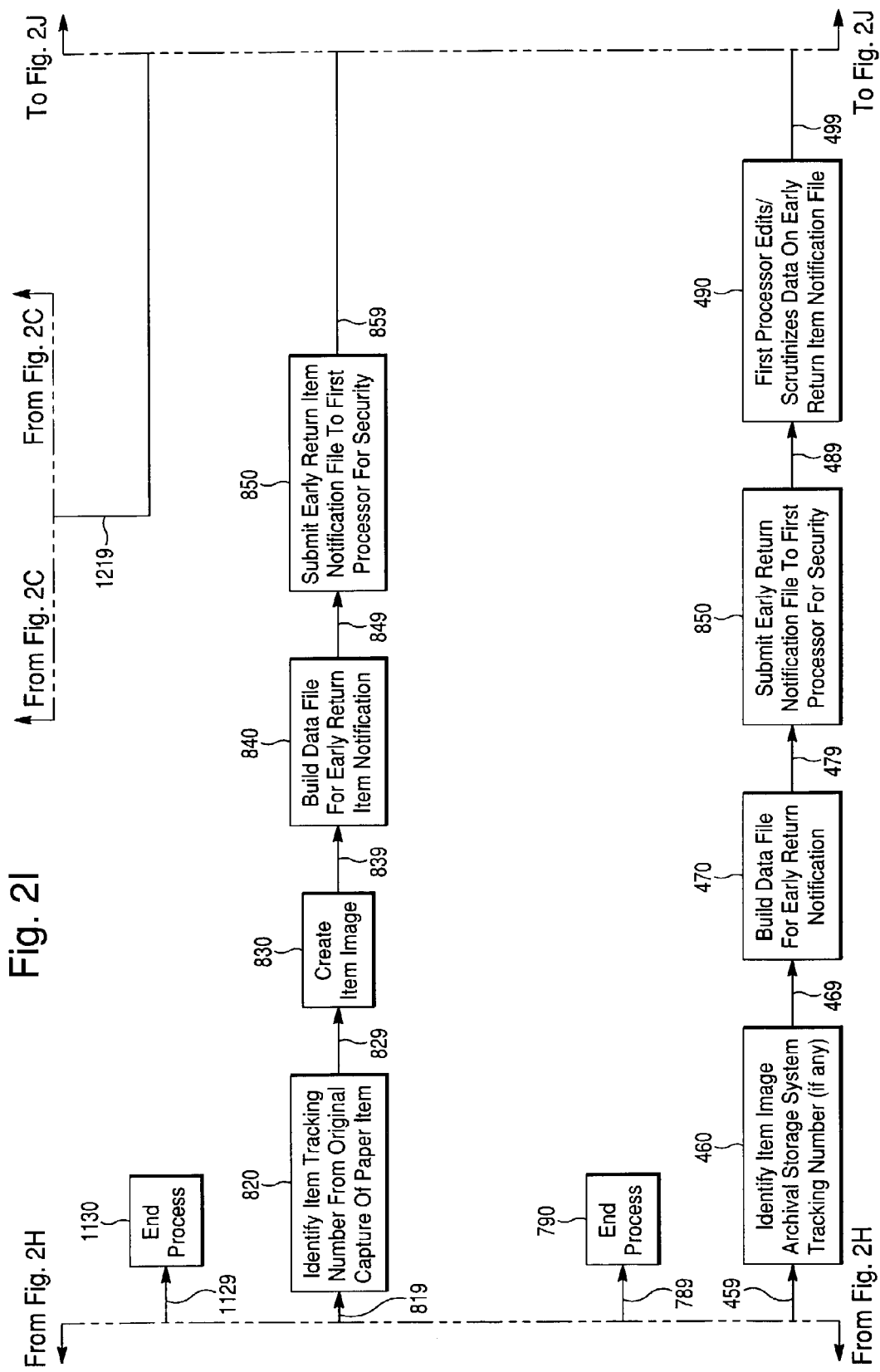

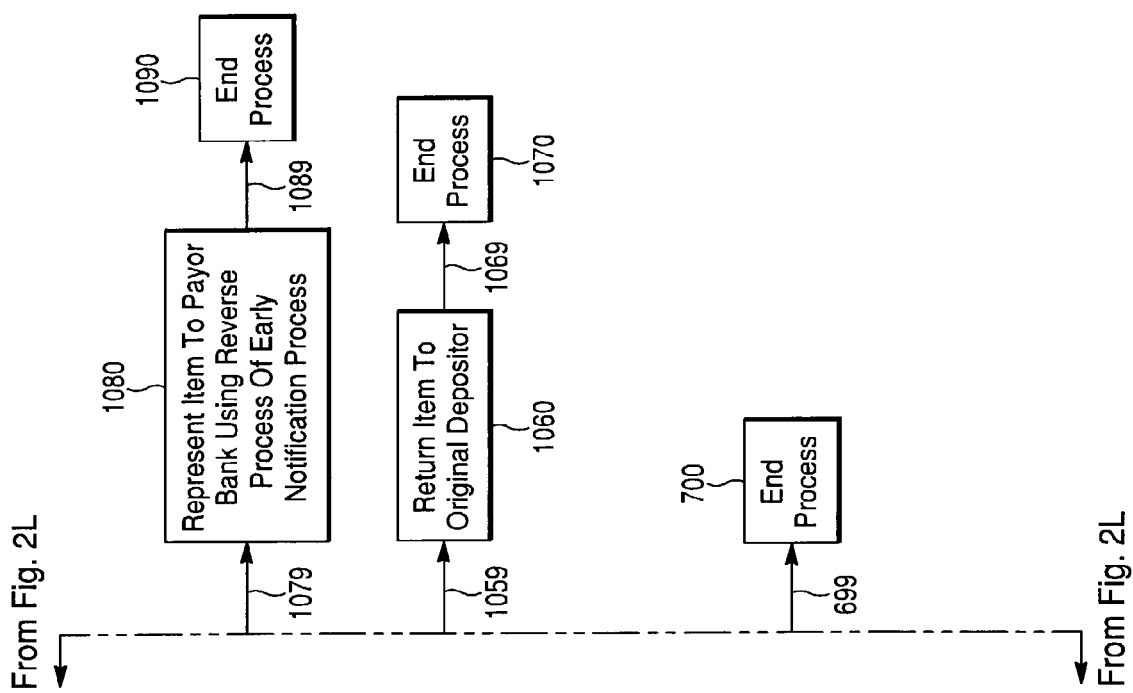

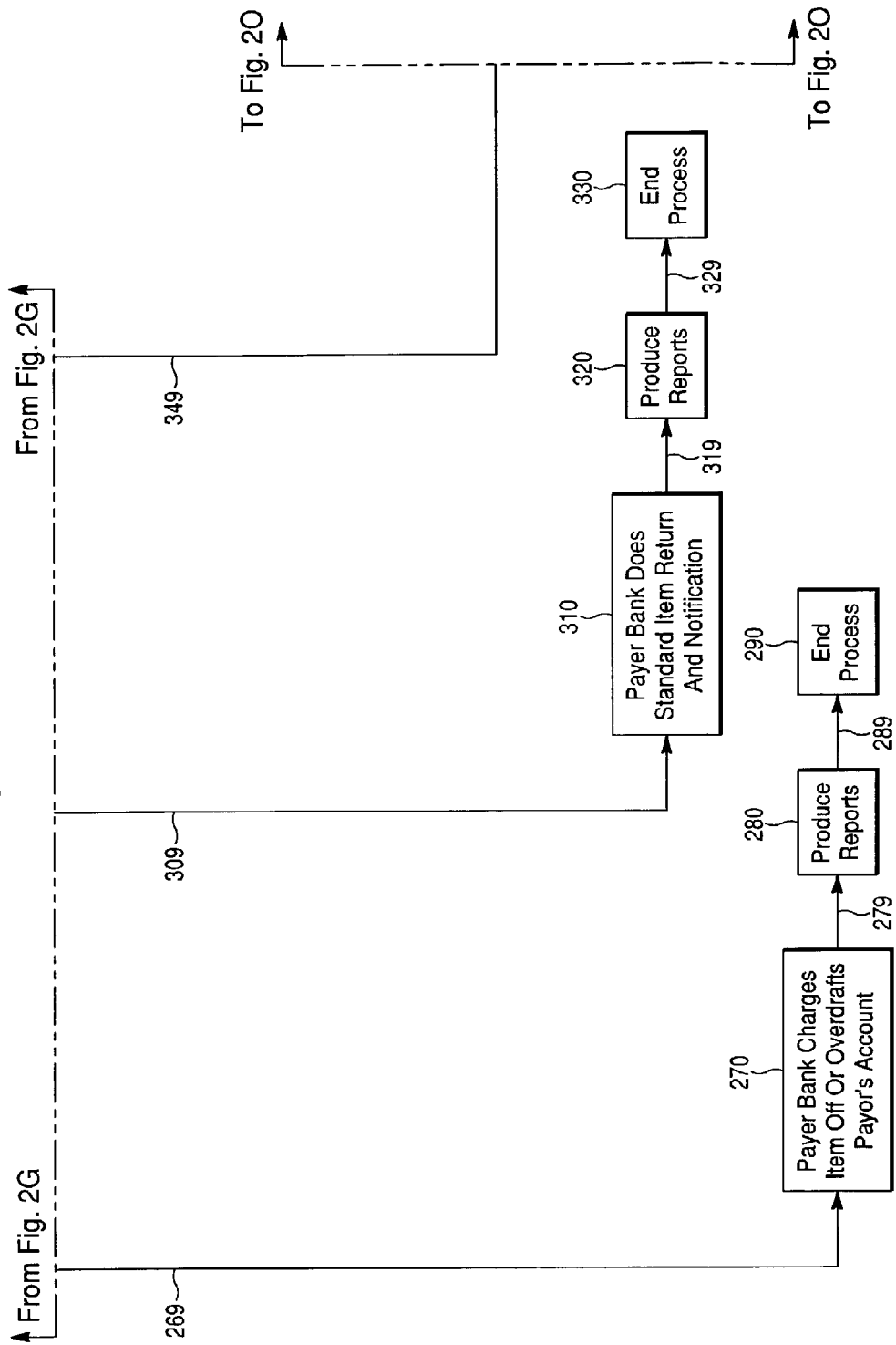

RETURN ITEM EARLY NOTIFICATION AND RETURN

CROSS-REFERENCE TO RELATED PATENT APPLICATIONS

This application is a Continuation-in-Part of U.S. application Ser. No. 09/560,779, filed Apr. 28, 2000. This application is a Continuation-in-Part of U.S. application Ser. No. 09/676,956, filed Oct. 2, 2000, which is a Continuation-in-Part of U.S. application Ser. No. 09/560,779, filed Apr. 28, 2000.

BACKGROUND OF THE INVENTION

It is desirable for a payor bank to notify a bank of first deposit as soon and as rapidly as possible when an item presented to the payor bank by the bank of first deposit will not be paid by the payor/payor bank, as well as to return that item to the bank of first deposit to facilitate early return of the item to the original depositor.

SUMMARY OF THE INVENTION

One embodiment of the present invention is a method for processing electronic return items, comprising: receiving directly or indirectly from a plurality of different payor banks a plurality of different electronic return notification files, each electronic return notification file in the plurality for a different bank of first deposit, each electronic return notification file including a data structure with a designated bank of first deposit, an amount, and a reference key for the return item and a return reason; sorting multiple electronic return notification files by designated bank of first deposit; and sending each of a plurality of the electronic return notification files directly or indirectly to its respective designated bank of first deposit.

In a further embodiment of the present invention, the receiving directly or indirectly from a plurality of different payor banks step comprises receiving from a first processor a plurality of different electronic return notification files from the plurality of different payor banks; wherein the first processor determines if the data in required fields in individual return item notification files are populated and whether the data in selected fields are within appropriate ranges, and initiates a communication process with the payor bank for a return notification file if errors are discovered in the data in order to obtain corrected data.

In a further embodiment of the present invention, the first processor identifies the central processor to which to send the electronic return notification from among a plurality of central processors at different locations based on a criteria.

In a further embodiment of the present invention, the first processor performs the steps of: sorting return notification files by central processor; and batching electronic return notification files and sending the batched electronic return files to the selected central processor.

In a further embodiment of the present invention, the criteria is one of a location of a bank of first deposit designated in the return item notification file and a location of a printer that services the bank of first deposit designated in the return item notification file.

In a further embodiment of the present invention, a step is performed of using the reference key to access an item image of the return item stored in an archive.

In a further embodiment of the present invention, the steps are performed of generating an electronic settlement document for the one of the electronic return files; sending the electronic settlement document directly or indirectly to the bank of first deposit designated in the return item notification file; and causing the data of the image of the return item to be provided directly or indirectly to the bank of first deposit.

In a further embodiment of the present invention, the steps are performed of summing the amount in the return item notification files for a designated bank of first deposit to obtain a sum for the designated bank of first deposit; and wherein the generating the electronic settlement document step comprises generating the electronic settlement document based on the sum for the designated bank of first deposit.

In a further embodiment of the present invention, the steps are performed of determining if the designated bank of first deposit requires a hard copy of the return item for a return transaction; accessing the image data of the return item in the archive with the reference key; selecting a printer location convenient to the designated bank of first deposit; and sending the image data of the return item to the selected printer location.

In a further embodiment of the present invention, the steps are performed of: accessing the image data of the return item in the archive with the reference key; and causing the image data of the return item to be sent to the designated bank of first deposit in the return item notification file.

In a further embodiment of the present invention, the step is performed of receiving with one of the return item notification files data for an item image of a respective return item.

In a further embodiment of the present invention, the steps are performed of: generating an electronic settlement document for the one of the electronic return files; and sending the electronic settlement document directly or indirectly to the designated bank of first deposit with the reference key to the return item.

In a further embodiment of the present invention, the step are performed of summing the amounts in return item notification files for a designated bank of first deposit to obtain a sum for the bank of first deposit; and wherein the generating the electronic settlement document step comprises generating the electronic settlement document based on the sum for the bank of first deposit.

In a further embodiment of the present invention, the steps are performed of determining if the designated bank of first deposit requires a hard copy of the return item for the return transaction; selecting a printer location convenient to the designated bank of first deposit; and sending the data for the item image of the return item to the selected printer location.

In a further embodiment of the present invention, the generating and sending an electronic settlement file steps only occur if the data structure for the electronic return notification file has a field completed indicating that data for an item image of the respective return item is attached.

In a further embodiment of the present invention, the step is performed of identifying errors in the electronic return file and obtaining correction of the identified errors.

In a further embodiment of the present invention, the obtaining correction step comprises notifying a payor bank to correct the errors; and receiving from the payor bank a corrected electronic return item notification file.

In a further embodiment of the present invention, the step is performed of determining if data of an item image of the return item is available electronically; and if not, then creating data for the item image of the return item.

In a further embodiment of the present invention, the steps are performed of: for a particular electronic return item notification file, selecting a printer location convenient to the designated bank of first deposit for the return item notification file; sending the electronic data for the item image of the return item to the selected printer location.

In a further embodiment of the present invention, the step is performed of storing data for an item image of a return item for each of a plurality of return transactions in an electronic archive.

In a further embodiment of the present invention, the steps are performed of accessing via the reference key an electronically stored archive file that includes item image data of the return item; and altering data in the archive file to indicate a return transaction.

In a further embodiment of the present invention, the step is performed of storing data for the item image of a return item for each of a plurality of return transactions on the Web.

In a further embodiment of the present invention, the step is performed of sending web content to a web client at a remote site to display a link to data for an item image in an archive of the return item associated with the electronic return item notification file.

In a further embodiment of the present invention, the sending web content step comprises sending the web content to a bank of first deposit.

In a further embodiment of the present invention, the sending web content step comprises sending the web content to an individual remote depositor.

In a further embodiment of the present invention, the displayed link comprises a configuration indicating the return reason.

In a further embodiment of the present invention, the web content includes a user interface to receive input instructions for the payor bank.

In a further embodiment of the present invention, the at least one input instruction comprises an activation of an overdraft loan process.

In a further embodiment of the present invention, the step is performed of receiving a re-presentment notice relating to the return item notification file from the bank of first deposit and including item image data of the return item or a reference to storage where the item image data for the return item may be accessed.

In a further embodiment of the present invention, the re-presentment notice is posted to a web site and a refresh electronic mail notice is sent to the payor bank A further embodiment of the present invention is a system for processing electronic return notifications, comprising: a first processor including a process for receiving from a plurality of payor bank processors, each associated with a different payor bank, different return item notification files, each of a plurality of the return notification files having a data structure that includes a field for a bank of first deposit and a field for a return reason, including a process for determining if the data in required fields in the return item notification file are populated and whether the data in selected fields are within appropriate ranges, including a communications process with the payor bank to be initiated if errors are discovered in the data in order to obtain corrected data, and including a process for identifying a central processor based on a criteria from among a plurality of central processors at different locations; the identified central processor including a process for sorting multiple electronic return item notification files by designated bank of first deposit and sending each of a plurality of the electronic return notification files directly or indirectly to its respective designated bank of first deposit.

A further embodiment of the present invention a method for returning an item to a bank of first deposit, comprising: obtaining access to data for the return item image and a reference key for the deposit transaction; creating a return item notification file with a data structure that includes a designation of a bank of first deposit for the return item; selecting a central processor based on a criteria related to the bank of first deposit; sending the data for the return image and the reference key to the selected central processor for processing.

In a further embodiment of the present invention, the obtaining access to data for the return item image comprises using the reference key to access and download data for the return item image of the return item from an archive.

In a further embodiment of the present invention, the obtaining access to the data for the return item image comprises performing the steps of determining if data of an item image of the return item is available electronically; and if not, then creating data for the item image of the return item.

In a further embodiment of the present invention, the steps are performed of accessing via the reference key an electronically stored archive file that includes data for the return item image of the return item; and altering data in the archive file to indicate a return transaction.

In a further embodiment of the present invention, the step is performed of receiving a re-presentment notice relating to the return item notification file from the bank of first deposit that includes data for the return item image of the return item or a reference to storage where the data for the return item image for the return item may be accessed.

In a further embodiment of the present invention, the obtaining access to the data for the return item image step comprises reducing a size of an image of a return item and adding routing history data around the periphery of the reduced size return item image.

A further embodiment of the present invention is program product for processing electronic return items, comprising machine-readable program code, which when executed, cause a machine to perform the following method: receiving directly or indirectly from a plurality of different payor banks a plurality of different electronic return notification files, each electronic return notification file in the plurality for a different bank of first deposit, each electronic return notification file including a data structure with a designated bank of first deposit, an amount, and a reference key for the return item and a return reason; sorting multiple electronic return notification files by designated bank of first deposit; and sending each of a plurality of the electronic return notification files directly or indirectly to its respective designated bank of first deposit.

A further embodiment of the present invention is a system for processing electronic return notifications, comprising: a first processor including a process for receiving from a plurality of payor bank processors, each associated with a different payor bank, different return item notification files, each of a plurality of the return notification files having a data structure that includes a field for a bank of first deposit and a field for a return reason, including a process for determining if the data in required fields in the return item notification file are populated and whether the data in selected fields are within appropriate ranges, including a communications process with the payor bank to be initiated if errors are discovered in the data in order to obtain corrected data, and including a process for identifying a central processor based on a criteria from among a plurality of central processors at different locations; the identified central processor including a process for sorting multiple electronic return item notification files by designated bank of first deposit and sending each of a plurality of the electronic return notification files directly or indirectly to its respective designated bank of first deposit.

A further embodiment of the present invention is a program product for returning an item to a bank of first deposit, comprising machine-readable program code, which when executed, causes a machine to perform the following method:

obtaining access to data for the return item image and a reference key for the deposit transaction; creating a return item notification file with a data structure that includes a designation of a bank of first deposit for the return item; selecting a central processor based on a criteria related to the bank of first deposit; sending the data for the return image and the reference key to the selected central processor for processing.

DETAILED DESCRIPTION OF THE PREFERRED EMBODIMENTS

Figure 1:
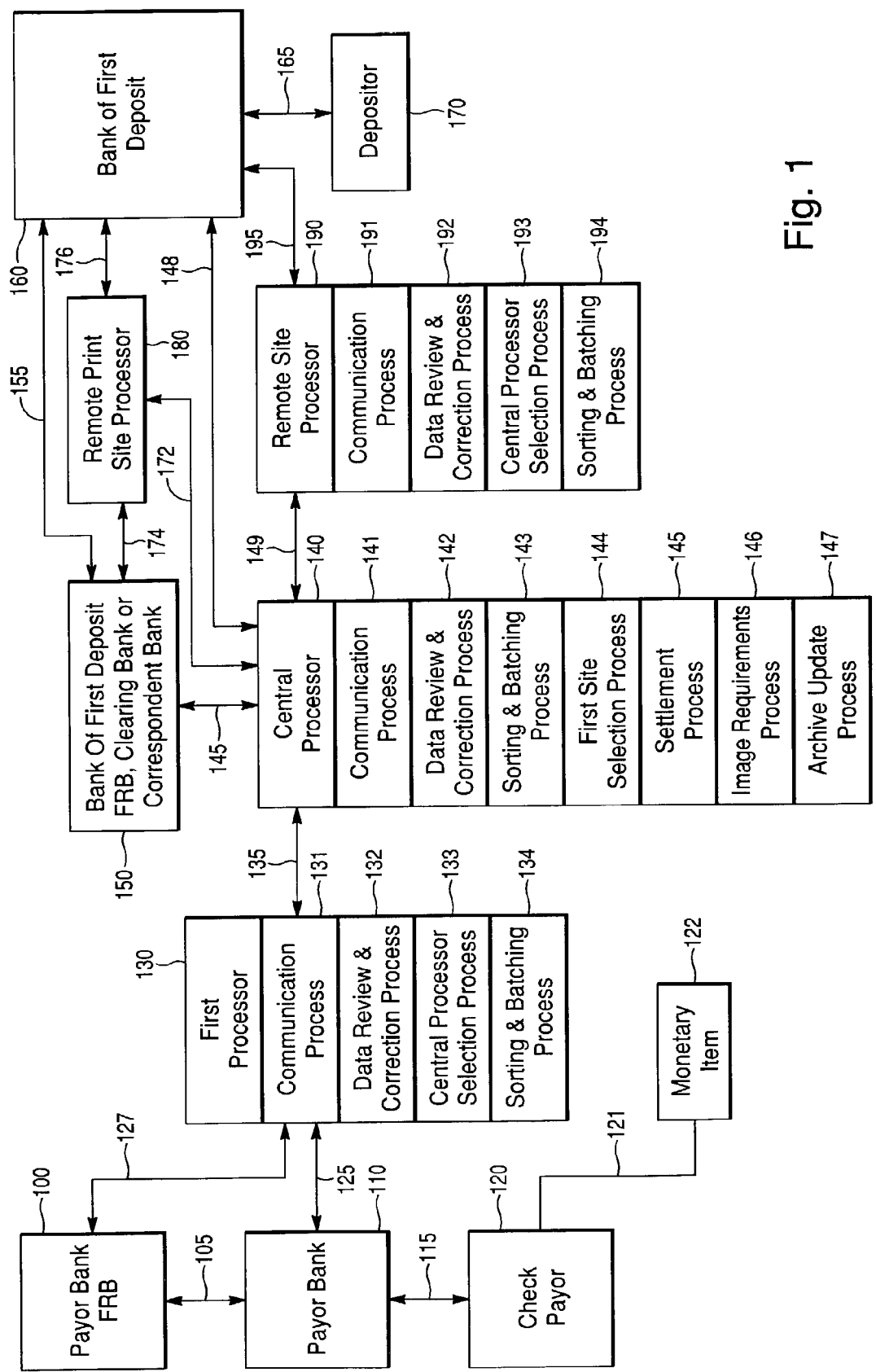
FIG. 1 is a schematic processor-level block diagram of an embodiment of the present invention.
Figure 2A:
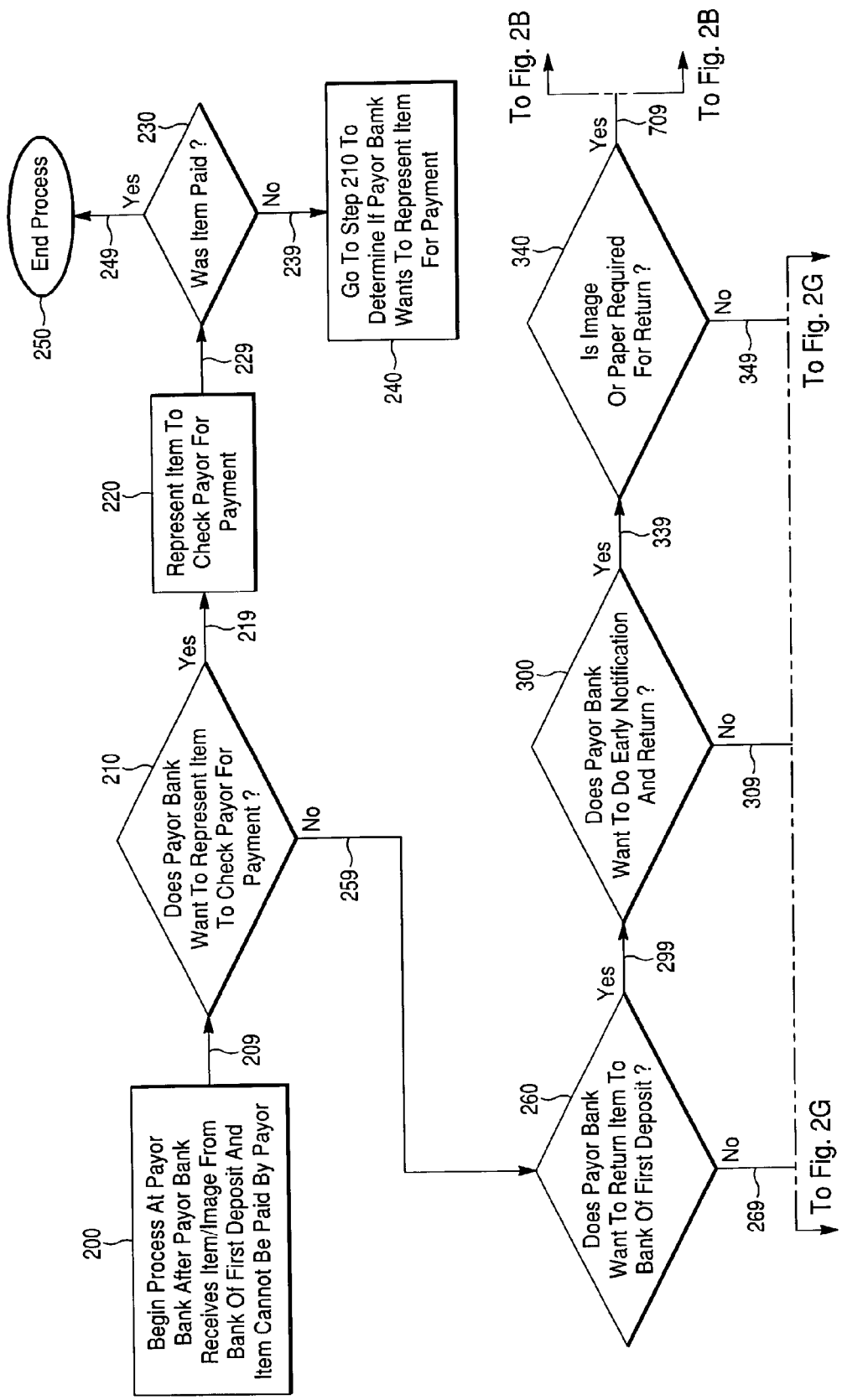
FIGS. 2A-2P are schematic flowchart of an embodiment of the present invention.
Figure 2B:
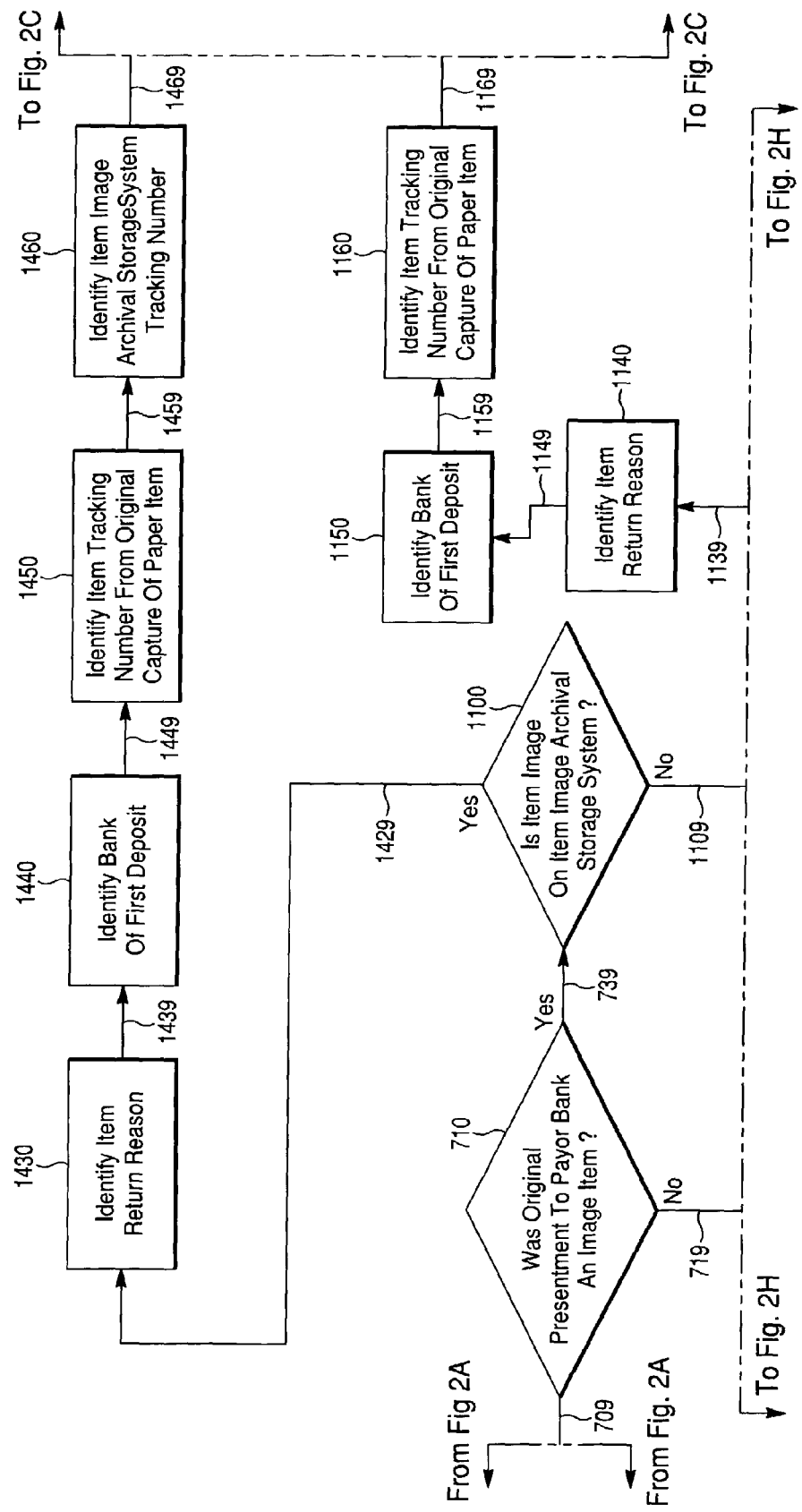
Figure 2C:
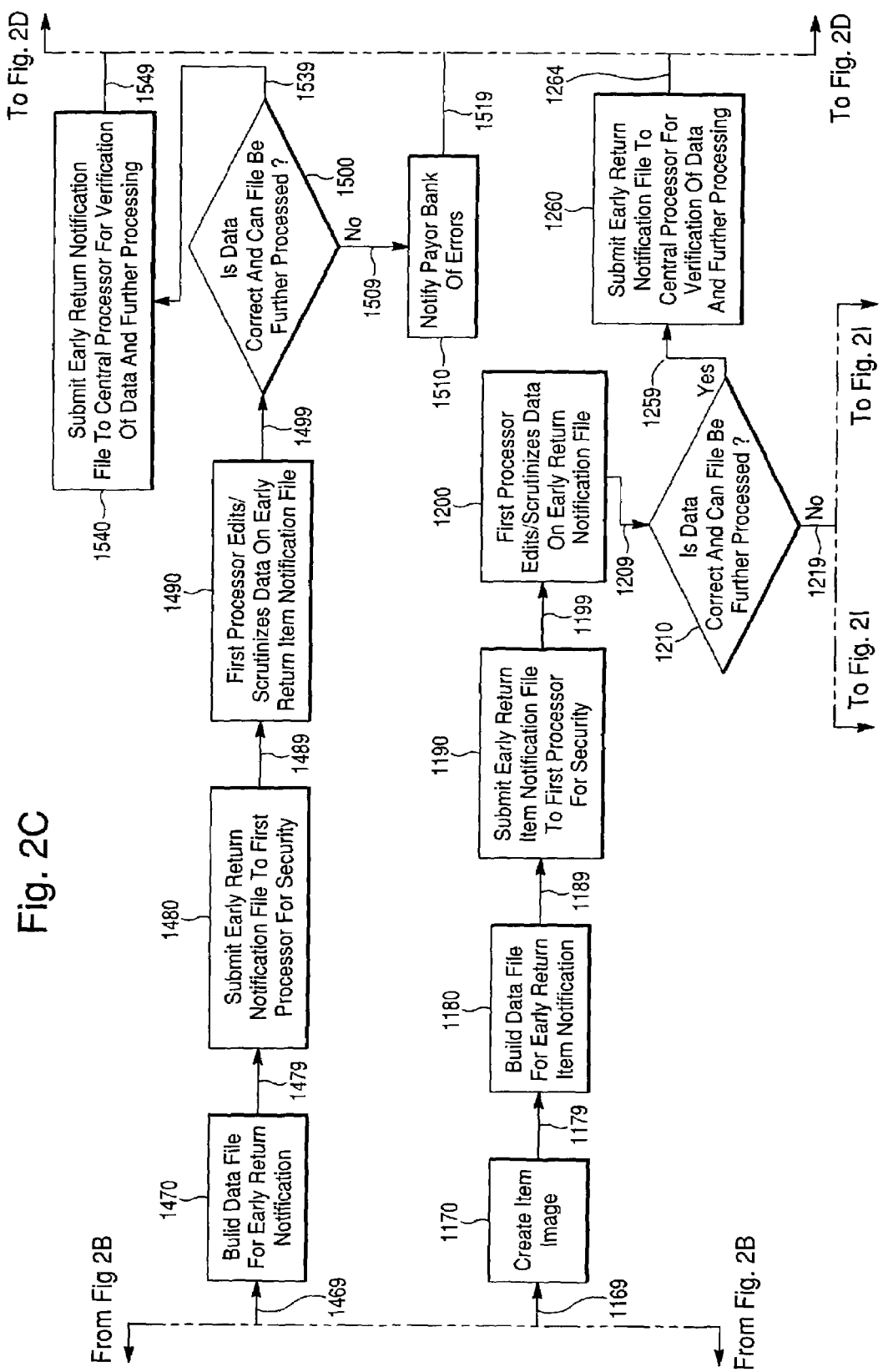
Figure 2D:
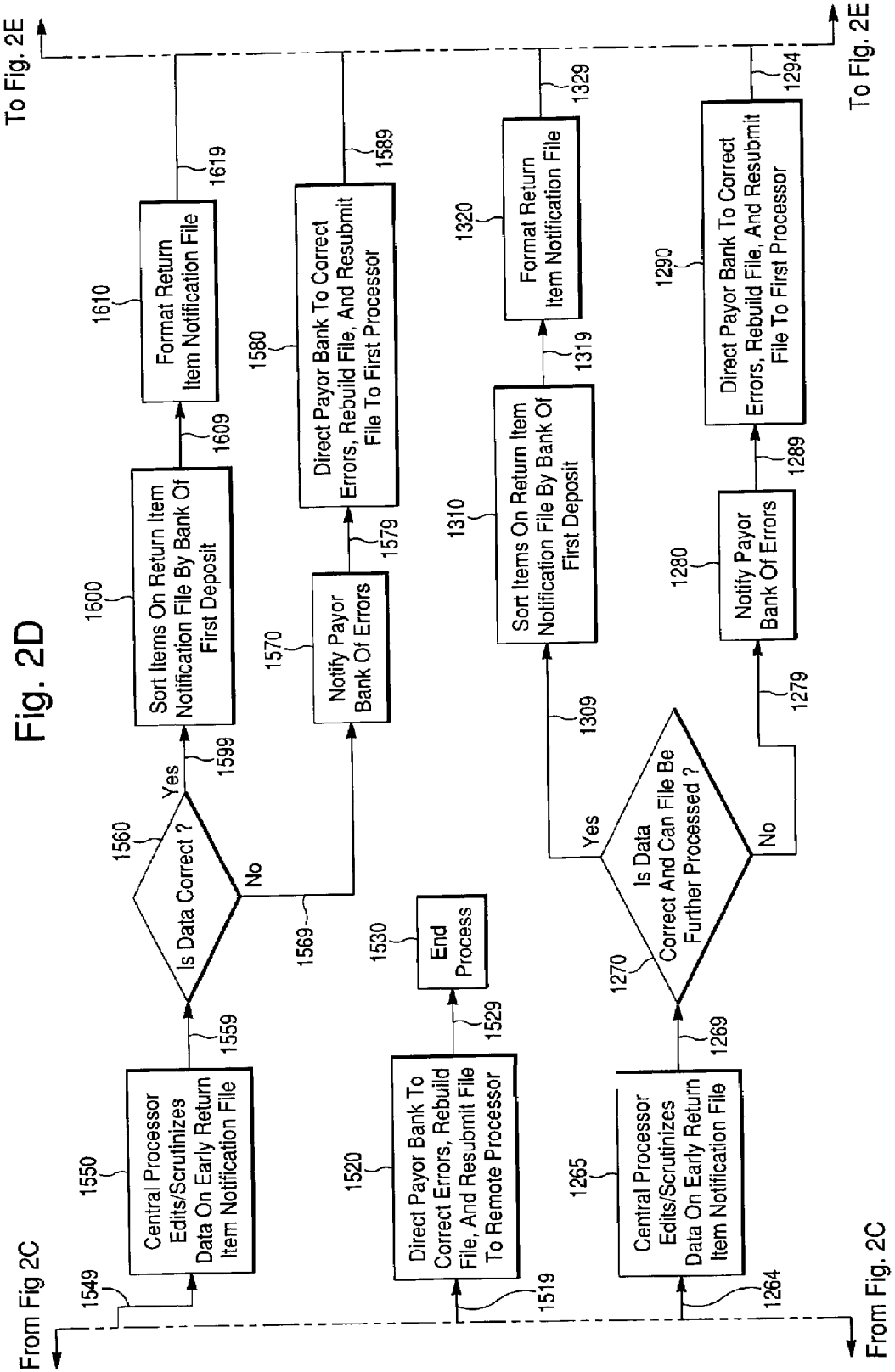
Figure 2E:
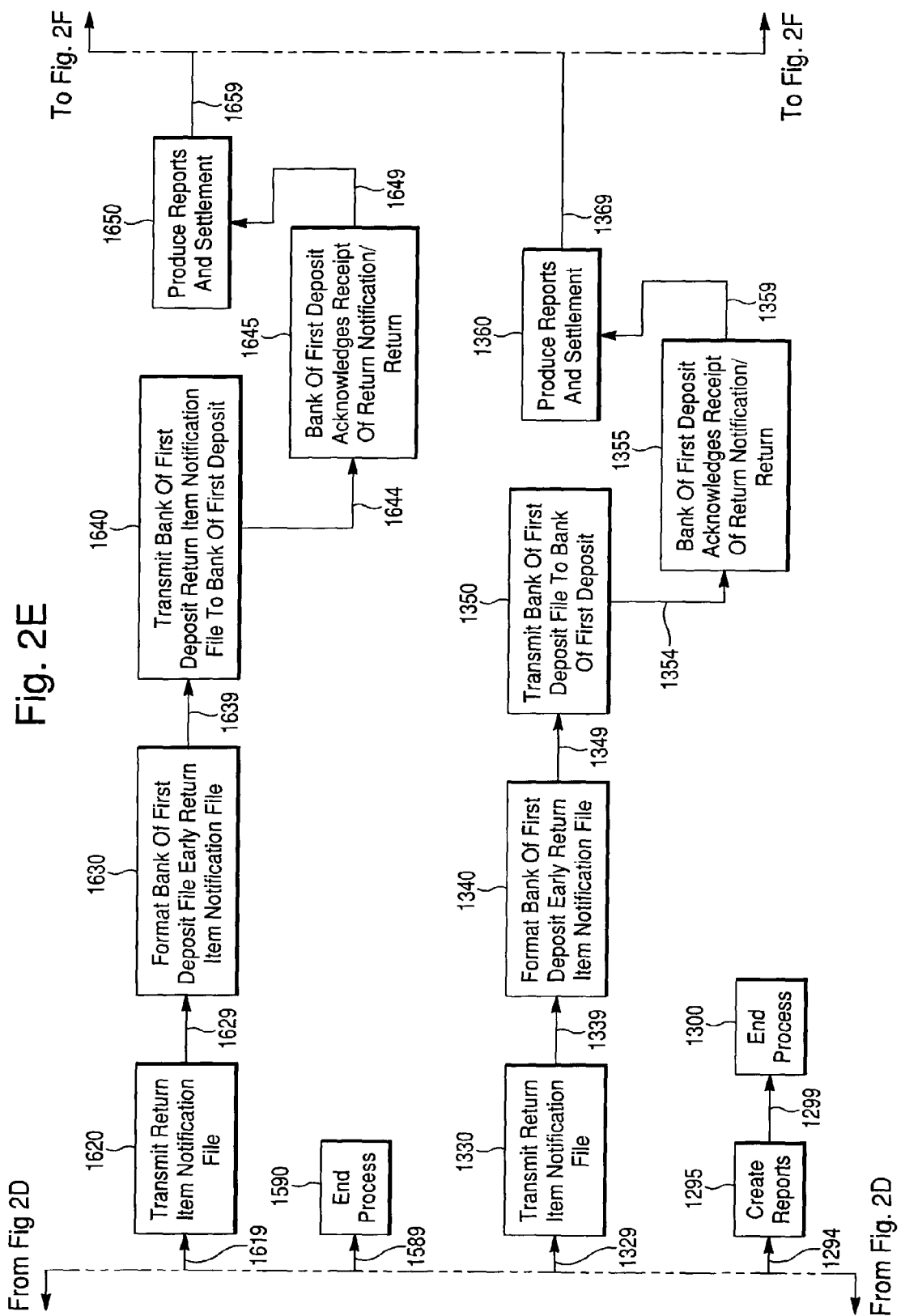
Figure 2H:
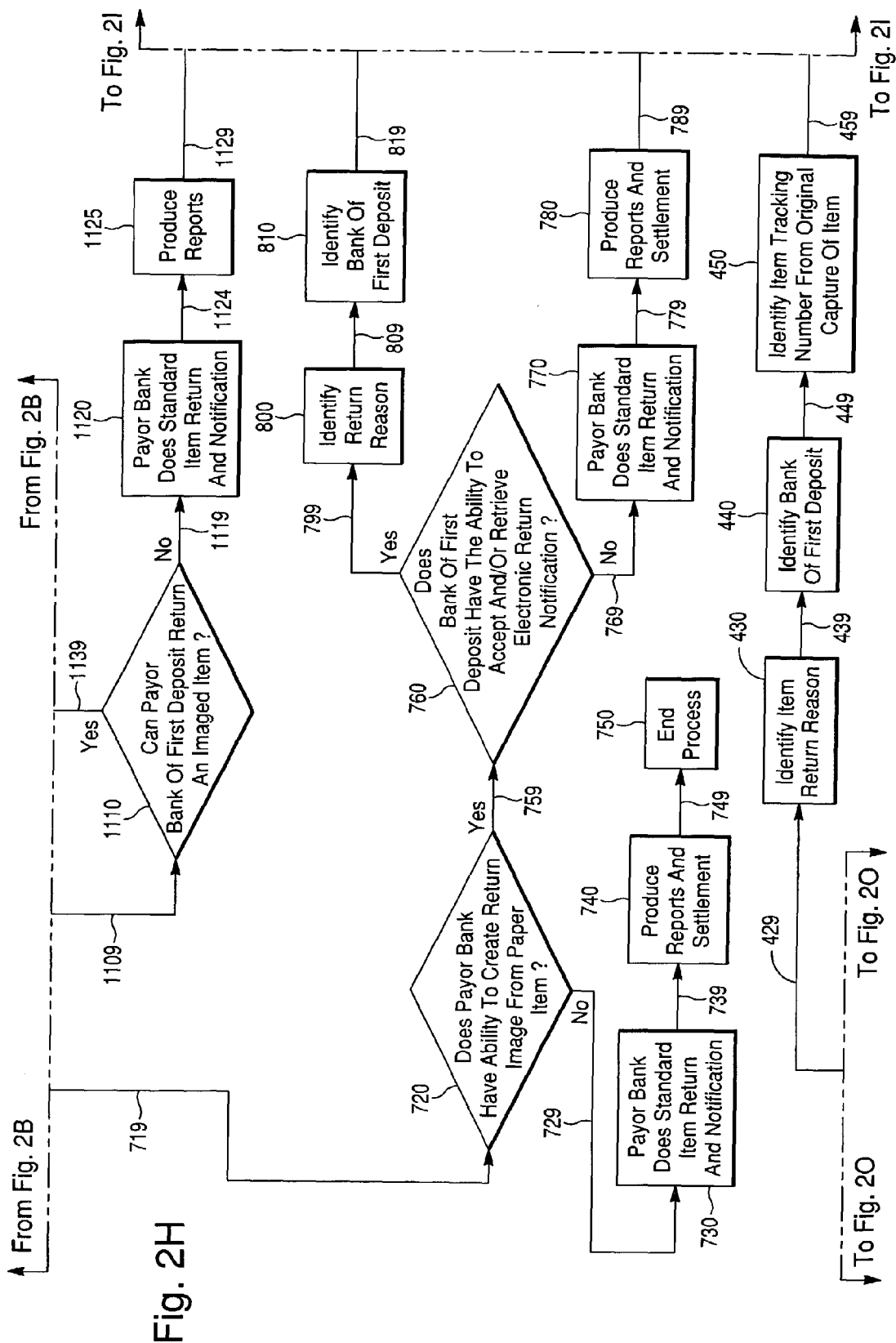
Figure 2J:
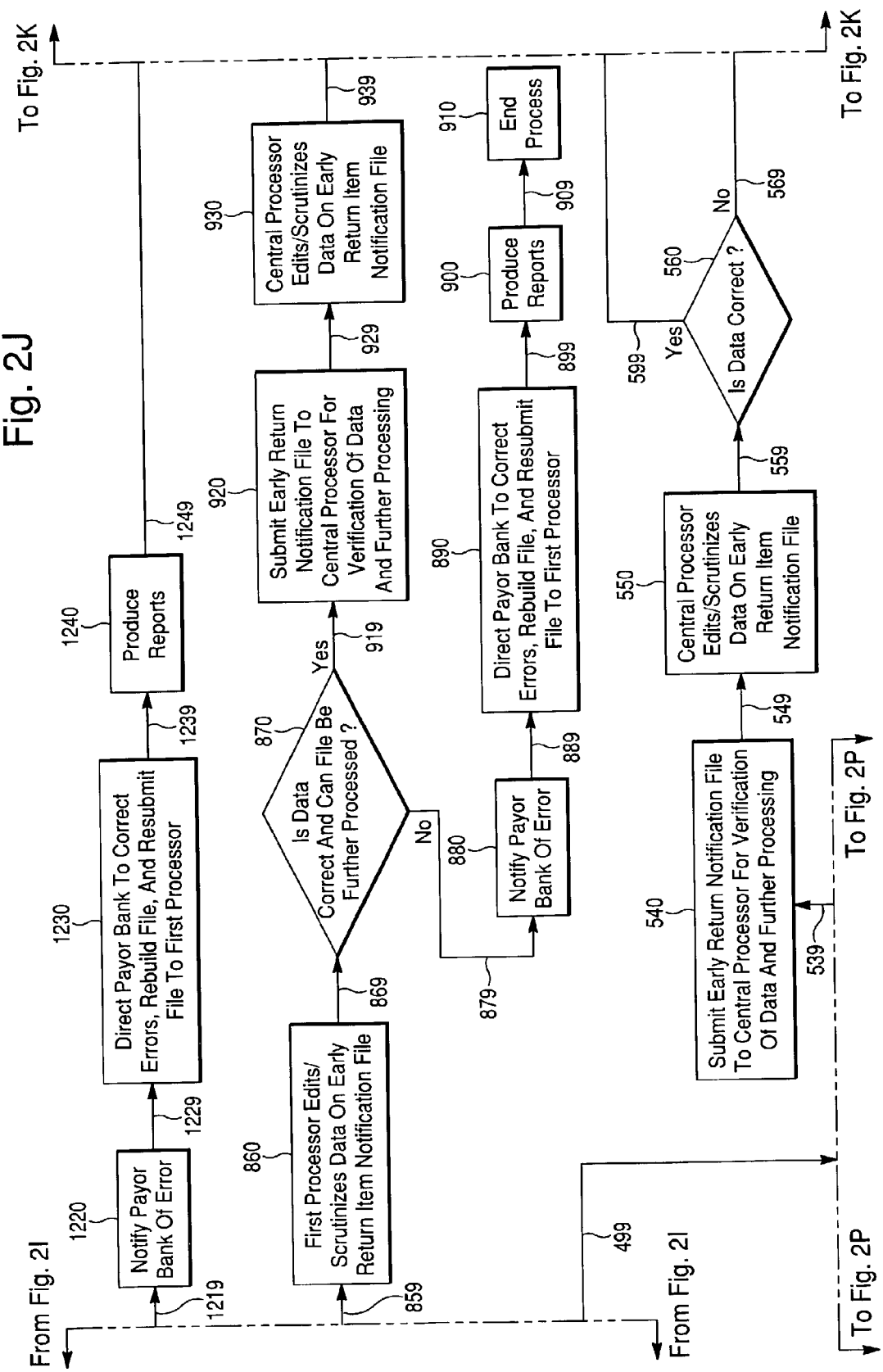
Figure 2K:
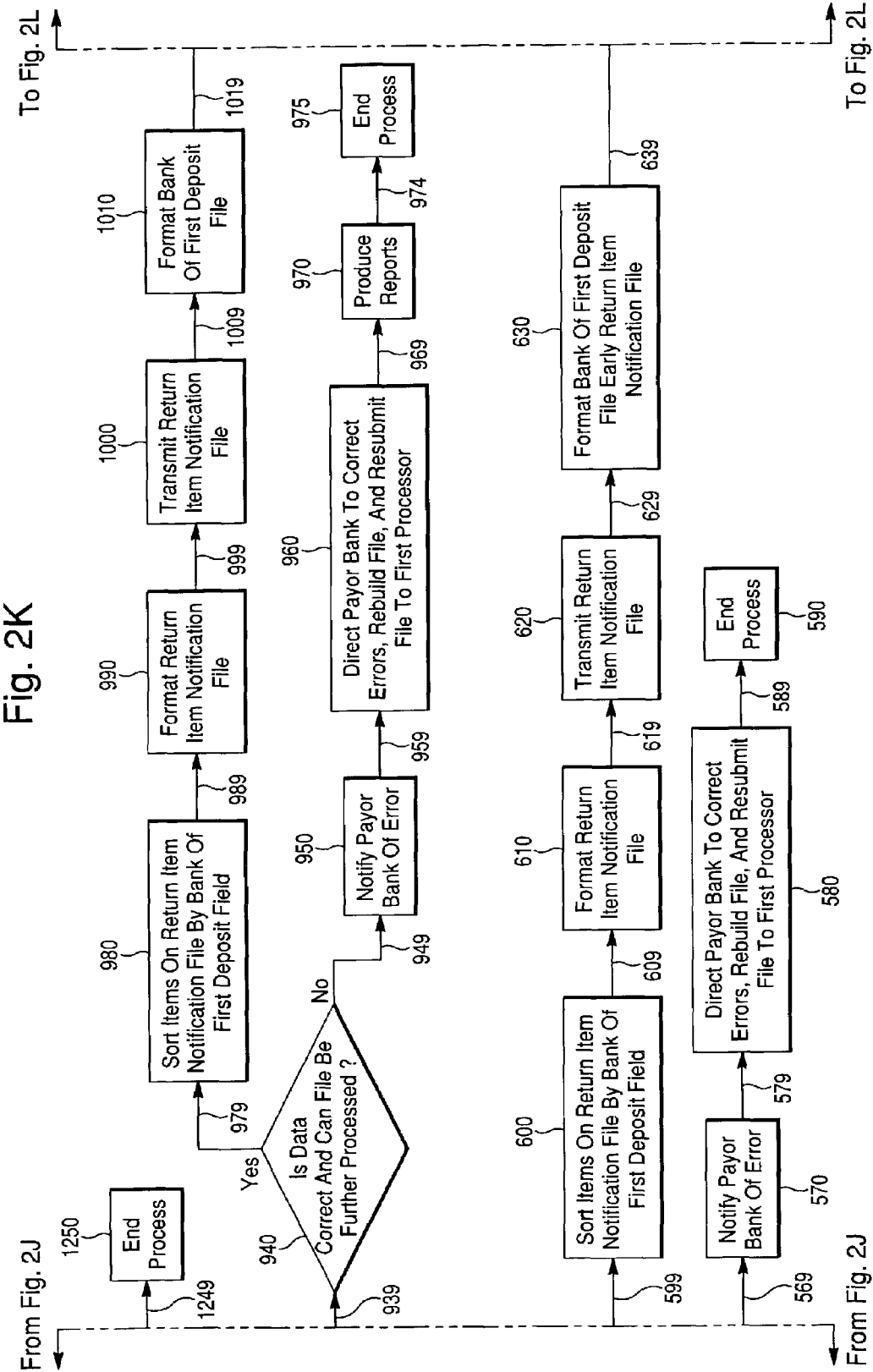
Figure 2L:
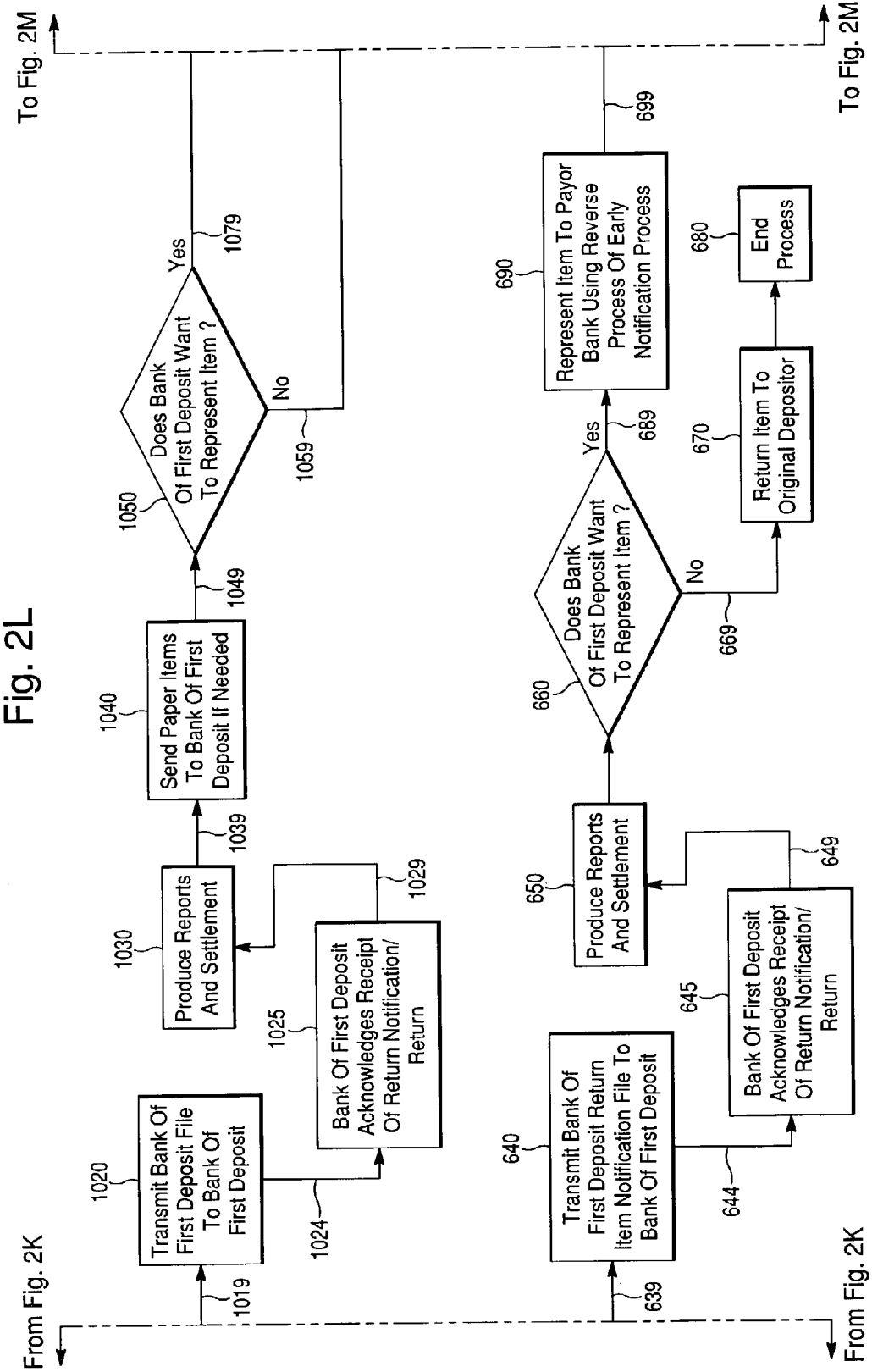
Figure 2O:
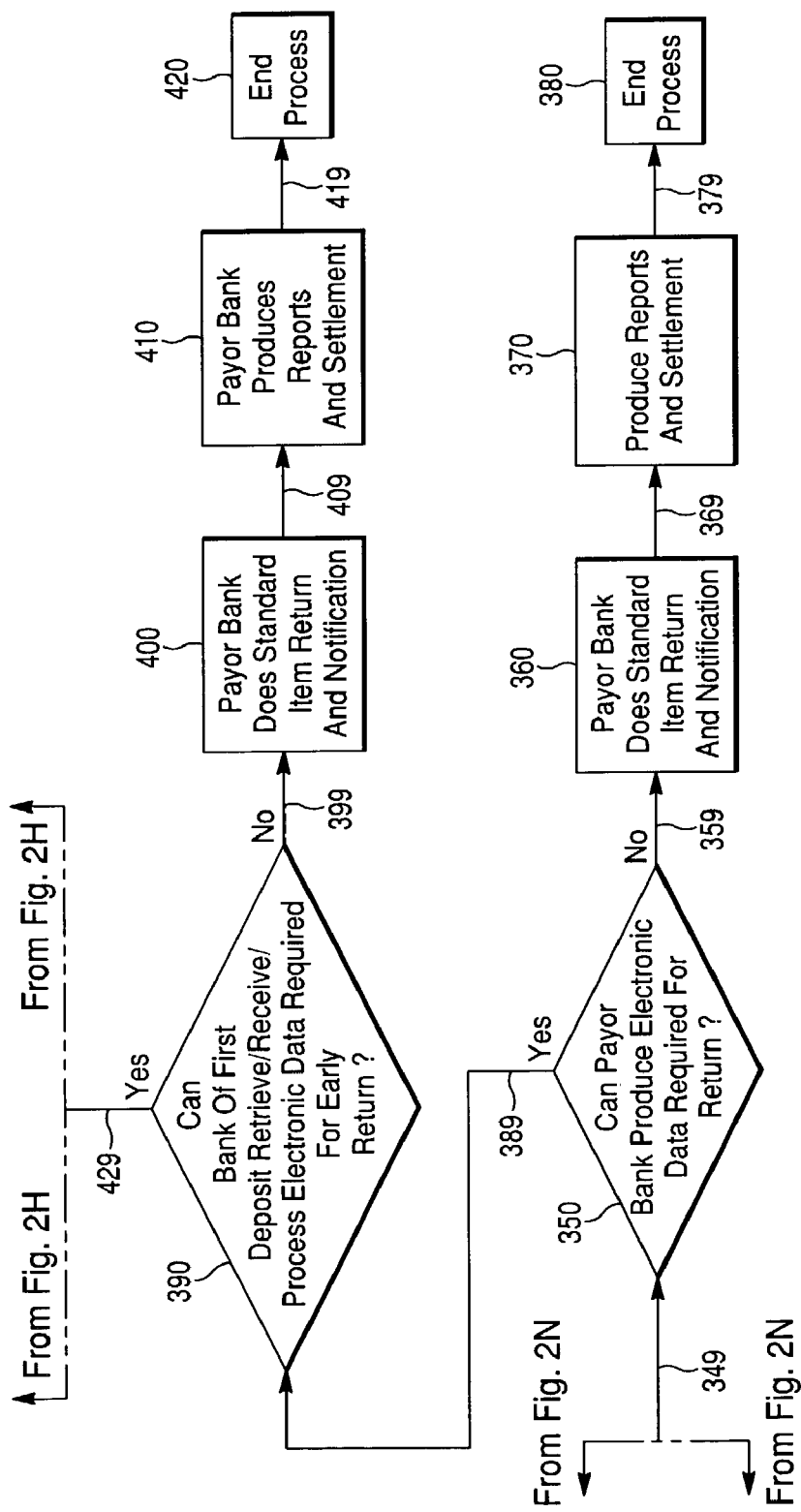
Figure 2P:
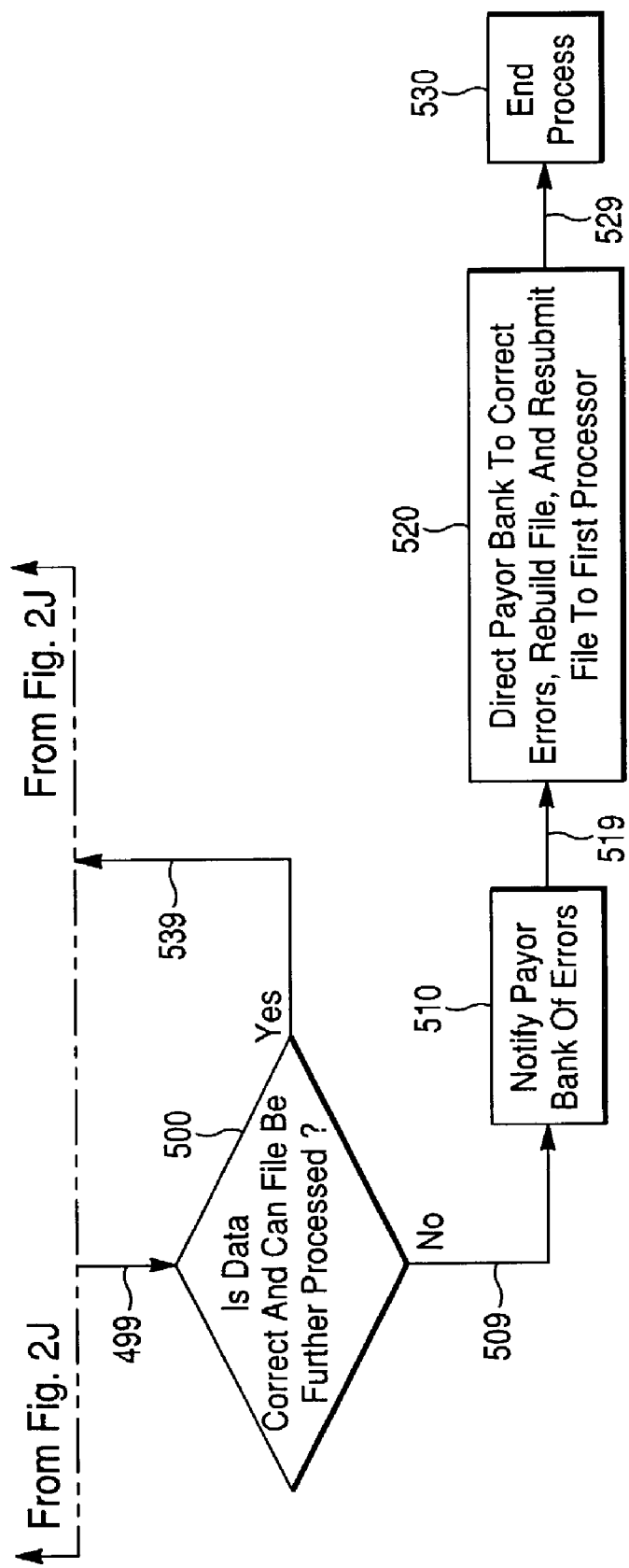

The present invention enables the electronic notification to a bank of first deposit, by a payor bank, of the intent to return an item to the bank of first deposit based on the fact the payor bank could not get the funds for the item from the check payor of the check. The return item early notification process described herein may be implemented in one embodiment with an original paper item or an image replacement document following the early notification. In a further embodiment of the present invention, the processes described herein can be used not only for notification of an item being returned, but can actually replace the current return item process that requires the return of the physical original or an authorized replacement document for the original.

The invention is described below with reference to drawings. These drawings illustrate certain details of specific embodiments that implement the systems and methods of the present invention. However, describing the invention with drawings should not be construed as imposing, on the invention, any limitations that may be present in the drawings. The present invention contemplates both methods and systems for remotely accepting a check for deposit and electronically processing the deposit without physically routing the physical paper copy of the check. The embodiments of the present invention may comprise a special purpose or general-purpose computer including various computer hardware, the execution unit portion of which may also be known herein as a "processor."

Embodiments within the scope of the present invention also include computer-readable media for carrying or having computer-executable instructions or data structures stored thereon and also known as software. Such computer-readable media can be any available media, which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, carrier waves or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules re-present examples of program code for executing steps of the methods disclosed herein. The particular sequence of such executable instructions or associated data structures re-present examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices. The distributed computing environment encompasses a client-server model of interaction, which includes World Wide Web interaction using communication protocols, such as for example, TCP/IP and HTTP.

An exemplary system for implementing the portions of the invention includes a general purpose-computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Program code or software comprising one or more program modules may be stored on the hard disk, magnetic disk, optical disk, ROM or RAM, including an operating system, one or more application or software programs, other program modules, and program data.

The computer may operate in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet.

In all cases where the invention sends files, electronic data, electronic reports, etc., these files, data, and reports can either be sent over communications lines to the appropriate destination or as an alternative (and without limiting the ability of the invention) they can be sent to a filing system or bulletin board where the involved parties can access the filing system or bulletin board to retrieve them as their individual schedules permit rather than having them sent to the receiving party by the origination party. Parties that can access the filing system or bulletin board to retrieve return item data and or images can include, but not be limited to, the check payor, payor bank, bank of first deposit, and original depositor. Accessing return data and images on either a filing system or bulletin board is done using an interface feature of the invention. This feature is a program module that runs on the accessor's computer that enables secure access by authorized individuals and presents the data and/or image to the accessor's computer screen in a formatted manner. The ability to view the information as compared to changing information and even which information they are allowed to change is determined by access tables maintained on either the central processor or the web site. An term "item image" used in the present application means the image data necessary to create an exact duplicate of the front and back of the original item presented for payment. The term "image replacement document" means an exact hardcopy duplicate of the original check and may be of variable size, and is intended to replace the original check and is known as an IRD. The image replacement document may be created by obtaining image data from the original paper item or by printing using the data from the item image. Wherever an item image or image replacement document is referred to herein as a replacement for an original check it should be understood that the original paper item has been voided or otherwise marked and/or destroyed to ensure that the original is not also presented for payment. The image or IRD then become the legal re-presentation and replacement of the original paper item. When an item is printed to facilitate the notification of a return item or the actual return of the item, the printing may be performed in accordance with the regulations of the governing authority or authorities. This includes, but is not limited to, the FRB printing format and the content of IRD and the specific requirement for printing return items on specific sized paper and including a MICR encoded tear strip formatted to have the route and transit number of the bank of first deposit as well as the return code showing that the item is a qualified return item.

Those skilled in the art realize that as an alternate embodiment of the invention, whenever the process flow calls for an original paper item to be forwarded to the bank of first deposit following a Return Item Early Notification to complete a return process, the original paper can be replaced by either a printed image replacement document (IRD) or an image of the original paper item without changing the core functionality or design of the invention. Also, returning the paper item to complete the return and re-presentment processes is dependent on the banks involved and on the specific return item and re-presentment process needs. If banking regulations require the return of the paper item used for the original presentment to the payor bank in order to facilitate the return item process, or if the paper item is required by the bank of first deposit for the re-presentment process, then the original paper items can be used to complete either the re-presentment or the return process. However, as alternative embodiments, the item image can be printed at the remote print site and presented to the bank of first deposit for the return item process or to the payor bank for the re-presentment process. Alternatively, the banks (i.e. Bank of first deposit and payor bank) can use the item image associated with the return notification for the purposes of completing the return item process, re-presentment or returning to the original depositor.

The actual location of the remote print sites is flexible and may be decided by the volumes of checks that are to be printed, and so that the remote print site is convenient to the clearing end point(s) for which that particular print site is printing IRD's. The print site location is not a limiting feature of the invention and print site location can be in FRB buildings, third party processing sites, Bank of First Deposit, and any other convenient location without limiting the functionality of either the print site or the inventive process.

As an integral part of the system the invention creates, prints, and stores reports to support all of the functionality and data flow of the system. This reporting can selectively be printed or stored as determined by system parameters set at installation time and updated as needed. The reporting parameters allow for the stored reports to be printed at a later date through on-line commands as well as to enable the reports to be selectively routed via e-mail, fax, transmission, etc. to anyone authorized to have a copy of a particular report.

Also, although not specifically mentioned in the process flow all items, reports, logs, etc, may be stored at various different locations in an archival storage system for access at any time by authorized individuals for research and audit purposes.

Whenever the process of producing reports is mentioned herein, it is referring generally to the process of reporting. The exact format and content of the reports is dependent on the reporting requirements of the reporting entity. The invention in a preferred embodiment is designed such that all of the information used to make and complete return item early notification and return is contained within the system and can be used to produce any reporting required by the reporting entity.

Those skilled in the art are aware that the processes governing return item notification and processing are governed by the financial authorities within the countries involved with the return of any particular item. The invention has been designed to adhere to the regulations of the governing authorities in all cases. Whenever a mention is made herein of governing authorities, federal regulations, Federal Reserve regulations, Federal Reserve Bank, etc., it is considered to be inclusive of all regulatory authorities worldwide that could determine return notification and return regulations within their jurisdiction.

Regulations governing the return item process also include the process know as settlement. Settlement is the process whereby a payor bank returning an item to a bank of first deposit creates necessary paperwork, notices, advises and transactions to enable all parties involved in the return item process (including the governing banking authority) to ensure that the monetary funds associated with the return item is transferred in the amount of the item being returned and follows the path of the item being returned. While the settlement process and transfer of funds must follow the regulations governing them, the invention has been designed such that such paperwork, notices, advises, and transactions can be created either in paper or electronic form as can best be accepted and used by the entities involved in the return item settlement process.

In general, the item images and the data associated with the item images as described herein are considered to be a single entity. In practice, and governed by efficiencies in handling data, the item images and associated data may be contained in either a single or multiple data records. The practice of separating item images and data does not effect the functionality of the invention and is facilitated by any records being separated for efficiency being logically tied together by unique identifiers (reference keys) such that at any given time all of the data and item images associated with any given item can be identified as if they were a single logical record.

The invention as described herein includes a data archival functionality. This archival functionality facilitates the storage of all information associated with any and all items processed by the invention. The information stored in the archival system includes item data, item images, all reports generated by the inventive process and any and all logs created by the invention for the purpose of tracking and reporting events associated with the inventive process. Those skilled in the art will understand that all information stored in the archival system is available for use and reporting as required to facilitate the inventive return item process as well as any other purpose required by the entities involved in the return item process. If an item image being returned, in accordance with any embodiment contained herein, was used for the original presentment to the payor bank, and that item image was stored in an archival system, the invention is designed such that it will maintain its own archival data and functionality as well as the ability to update the original presentment archival data to show the early return notification and return information to include, return reason, return date, etc., and any other information required to show that a return on a specific item as described herein, has taken place.

Referring to FIG. 1, the Check Payor 120 is the person who originally created the Monetary Item 122 and is responsible for having sufficient funds in their bank account to pay the Depositor 170 an amount for which the Monetary Item 122 was created. The Monetary Item 122 is generally presented by the Check Payor 120 to satisfy a financial obligation between the Check Payor 120 and the Depositor 170. While the Monetary Item 122 is generally used to satisfy a financial obligation between the Check Payor 120 and the Depositor 170, this is not a requirement of the invention nor does it significantly affect the process generally involved in the invention and is presented herein for illustrative purposes. In general, the Monetary Item 122 was created by the Check Payor 120 to pay some financial obligation and ultimately the Monetary Item 122 was presented to the Depositor to satisfy that financial obligation. Whether the Monetary Item 122 is originally presented to the Depositor 170 directly by the Check Payor 120 or by another party that received the Monetary Item from the Check Payor 120 does not affect the invention as illustrated.

FIG. 1 illustrates the primary components involved in the invention and shows the relative relationship of those components. Using FIG. 1 those skilled in the art will understand the concepts involved in the Return Item Early Notification and Return of a Monetary Item 122 that has been presented by a Depositor 170 to the Check Payor 120 using, for example, the commonly accepted return check clearing processes and paths. The inventive process comes into play when the Monetary Item 122 is presented to the Check Payor 120 by the Payor Bank 110 after it has been deposited in the Depositor's 170 account at the depositor's bank also know as the Bank of First Deposit 160. The Monetary Item 122 may be then forwarded through the normal clearing processes to the Payor Bank 110 and presented to the Check Payor 120 and the Check Payor 120 does not pay the Monetary Item 122. The Check Payor not paying the Monetary Item 122 can be caused by a number of things including not enough money in the Check Payor's 120 deposit account to cover the amount of the check, the Check Payor's 120 deposit account has been closed, etc. If the Check Payor 120 does not pay the Monetary Item 122, the Payor Bank 100, using the inventive process, will create an electronic image of the Monetary Item 122 (if not already in item image form) and send it back to the Depositor 170 using the paths illustrated in FIG. 1.

Primary components used by the Return Item Early Notification and Return Process are illustrated in FIG. 1. These components include a First Processor 130, a Central Processor 140, and a Remote Print Site Processor 180. These components are shown in FIG. 1 in relative position as they are used within the inventive process. The actual location of these components is determined by the technical requirements for efficient processing of the images and data associated with the Return Item Early Notification and Return inventive processes. Therefore, each of these components is placed in the physical location that will facilitate the most efficient operation of the inventive process. For example the First Processor 130 can be located at the Payor Bank Site 110, at the Payor Bank FRB Site 100 or at any other location appropriate for the efficient operation of the system without changing the basic functionality of the invention. The location of each of the other components of the inventive process re-presented by the Central Processor 140 and the Remote Print Site Processor 180 can be located in a location that is most efficient for the processing of Return Items in accordance with the invention without changing the basic functionality or processes involved in the invention. The decision of where to physically place each of the involved processors is made based on the number of items being processed through the invention, which Payor Bank 110 the items are coming from, where the location of the rest of the processors is, how much excess processing power each processor has, which processor would be best able to handle the check volume coming from a specific payor bank in the most efficient manner, etc. The decision of which processor to used is an integral feature of the invention and is made dynamically based on the volume of items being processed at any given time and which processor(s) will handle the newly presented items most efficiently.

The present invention, in one embodiment, comprises a plurality of central processor sites, with the location of each central processor site chosen to meet processor volume, bank of first deposit locations, and other criteria. Each of a plurality of the central processor sites receives directly of indirectly from a plurality of different payor banks a plurality of different electronic return notification files, each electronic return notification file in the plurality for a different bank of first deposit. Generally, each central processor site will be assigned a predetermined set of banks of first deposit to service during normal volume periods. This set may be dynamic and certain banks of first deposit may be shifted to or away from the central processor site to alleviate volume of other constraints.

Each of a plurality of the central processors 140 in one embodiment of the invention would comprises a communications process 141 for effecting communication with the payor banks, a set of first processors to be discussed below, bank of first deposit FRB's, clearing banks, correspondent banks, banks of first deposit, re-presentment site processors 190 and various archive sites. As noted above, the communication process may comprise one or more of the communication modes listed such as intranets, extranets, the Internet, the Web, as well as other communications modes. The embodiment would also include a data review and correction process 142 to be described in detail below. The embodiment may optionally also include a sort and batch process 143 for sorting the electronic return item notification files by bank of first deposit, by printer location if an IRD (hardcopy) is required, or using some other desired sort method. The embodiment may also include a remote site selector process 144 for selecting a remote site for further processing based on a criteria. The embodiment would also include a settlement process 145 to transfer funds back through the system, as previously described. The embodiment would also include an image requirements process 146 to query either various designated banks of first deposit to determine if they require a hardcopy to facilitate their return process or to determine the hardcopy requirements of the various banks of first deposit from a list maintained at the central processor site or other site or on a Web site. The embodiment may also include an archive update process 147 for accessing a return item in an archive to add data indicating the return.

In a further embodiment of the present invention, a plurality of the return item notification files are received indirectly from different payor banks via a first processor 130. The first processor receives a plurality of different electronic return notification files from the plurality of different payor banks, and after processing, forwards the return item notification files to a central processor. The first processor 130 includes a communications process 131 for effecting communication with a plurality of different payor banks, a set of central processors 140, various archive sites, and other desired locations. As noted above, the communication process may comprise one or more of the communication modes listed such as intranets, extranets, the Internet, the Web, as well as any other communications modes. The processing by the first processor 130 may comprise a data review and correction process 132 for determining if the data in required fields in individual return item notification files are populated and whether the data in selected fields are within appropriate ranges, and a process for initiating a communication with the payor bank for a return notification file if errors are discovered in the data in order to obtain corrected data. The first processor site 130 may also include a central processor selector process 133 for identifying a central processor to which to send the electronic return notification from among the plurality of central processors at different locations based on a criteria. In one embodiment, the criteria may be one of a location of a bank of first deposit designated in the return item notification file and a location of a printer that services the bank of first deposit designated in the return item notification file. In a yet further embodiment of the first processor site 130, a sort and batch process 134 may be included to sort return notification files by central processor and batch the sorted electronic return notification files and sending the batched electronic return files to the selected central processor.

In a further embodiment of the present invention that facilitates re-presentment process (to be discussed later), a plurality of the return item notification files designated for re-presentment to designated payor banks are received by a re-presentment processor 190 directly or indirectly from a plurality of different banks of first deposit 160. The re-presentment processor 190, after processing, forwards the return item notification files for re-presentment to a central processor. The re-presentment processor 190 includes a communications process 191 for effecting communication with the a plurality of banks of first banks, bank of first deposit FRB's, clearing banks, correspondent banks, and various archive sites. As noted above, the communication process may comprise one or more of the communication modes listed such as intranets, extranets, the Internet, the Web, as well as other communications modes. The processing by the re-presentment processor 190 may comprise a data review and correction process 192 for determining if the data in required fields in individual return item notification files are populated and whether the data in selected fields are within appropriate ranges, and a process for initiating a communication with the payor bank for a return notification file if errors are discovered in the data in order to obtain corrected data. The re-presentment processor site 190 may also include a central processor selector process 193 for identifying a central processor to which to send the re-presentment from among the plurality of central processors 140 at different locations based on a criteria. In one embodiment, the criteria may be one of a location of a payor bank designated for the re-presentment in the item file and a location of a printer that services the payor bank designated in the item file. In a yet further embodiment of the re-presentment processor 190, a sort and batch process 194 may be included to sort re-presentment files by central processor and batch the sorted electronic return notification files and sending the batched electronic return files to the selected central processor.

The rest of the components illustrated in FIG. 1 represent involvement of various entities in the current return item process as well as the inventive Return Item Early Notification and Return Process. These components are shown in relative position in FIG. 1 and include the Monetary Item 122, the Check Payor 120, the Payor Bank 110, the Payor Bank FRB 100, The Bank of First Deposit FRB, Clearing Bank, of Correspondent Bank 150, the Bank of First Deposit 160 and the Depositor 170. A more specific description of the involvement of each of those components will be done in further detail in the FIG. 2 process flow description contained herein.

Referring to FIG. 2, a payor bank has received a check to be charged against an account of a customer (check payor) of the payor bank.

In step 200 the inventive process is initiated by the payor bank decision process after the payor bank receives an item to be paid by the check payor from the bank of first deposit. If the item cannot be paid by the check payor, because the check payor's account is a closed account or there are not sufficient funds in the check payor's account, etc., the payor bank needs to determine if they want to re-present the item to be paid by check payor 210. Most financial institutions have a set of rules determining by customer how many times they will attempt to charge an account of a check payor for a monetary item drafted by the check payor. Based on this set of rules the payor bank can attempt to charge the check payor's account until the rules determine that the monetary item should be returned to the depositor as an uncollectable item. If the payor bank wants to re-present the item to the check payor 219 the item is re-presented to the check payor in step 220. If the item is again not paid 230, the payor bank then needs to again determine via step 240 to step 210 if they want to re-present the item to the check payor to be paid. The determination of re-presenting the item to the check payor by the payor bank can be made by the payor bank based on the payor bank's policies for re-presentment. In addition, the payor bank can have an agreement with the bank of first deposit to re-present the item to the check payor a given number of times prior to sending it back to the bank of first deposit. The payor bank makes this decision by returning to step 210 and determining if they want to re-present the item to the check payor for payment. If in step 230 the re-presented item is paid the process ends 250. As an alternative to the payor bank and bank of first deposit having a automatic re-presentment policy, when the bank of first deposit receives the returned item it can resubmit the item to the payor bank for payment through the normal or inventive re-presentment channels a set number of times (based on the bank of first deposit policies) prior to sending the item back to the depositor and charging the depositor's account for the amount of the unpaid item.

If in returning to step 210 the payor bank determines they do not want to re-present the item to the check payor for payment the payor bank needs to determine if they want to return the item to the bank of first deposit 260. This decision is also based on the set of rules the payor bank maintains for the purpose of determining when/if to return a monetary item. If the payor bank does not want to return the item to the bank of first deposit, the payor bank charges the item off as a loss or overdrafts the check payor's account 270, produces reporting 280 associated with the return item/overdraft decision and the process ends 290.

If in process step 260 the payor banks wants to return the item to the bank of first deposit the payor bank needs to determine in step 300 if they want to do a return item early notification and return to the bank of first deposit of the return of the item. The decision to do a return item early notification is based on the ability of the payor bank to handle the technical requirements of return item early notification and is explained in more detail herein. If in decision step 300 the payor bank does not want to do an early return notification to the bank of first deposit of the return of the item 309 then the payor bank does a standard return item and standard notification 310. The standard return includes the return of the physical item that is not being paid by the check payor and the normal notification of the Federal Reserve Bank (FRB) of returning the item to the bank of first deposit. After the payor bank does the standard return 310 the payor bank produces reporting 320 associated with the return item decision and the process ends 330.

However, if in returning to decision step 300 the payor bank wants to do an early notification and return 339 of an unpaid item the payor bank determines if an item image or paper item is required for return 340. The invention is capable of a combination of returning a paper item, returning an image of an item, or not returning either an image or paper item (i.e. sending only the necessary electronic information to enable the bank of first deposit to further process the returned item), based on the check payor banks capabilities and policies and the federal banking requirements. One skilled in the art can understand that if only data is required to complete the return process, this data can be formatted as required to fit the needs of the payor bank, the bank of first deposit or to adhere to banking industry data format requirements including, but not limited to, such formats as ACH, RCK, as well as others. ACH is a current industry format for presentment of data and RCK is a current industry format for returning items when only data is required to complete the return. If in step 340 neither a paper nor an item image of the item is required to complete the return 349 the payor bank determines in step 350 if it is capable of producing and sending only the electronic data required for the return. The decision is step 350 is dependent on the payor bank having all of the information required to correctly identify the item being returned in electronic format. This is the information required by the bank of first deposit to correctly identify the item being returned such as route and transit number of the item, serial number, account number, original item capture number (created from either the original physical capture or electronic capture) and image number, etc. This information is taken from the original presentment of the item (either from a physical item or an item image—depending on the format used for presentment of the item through the check collection process). If the payor bank is not capable of producing the electronic data required, the payor bank 359 does a standard return and notification of the return item 360, produces the necessary reporting 370 and settlement documents for the return process and the return process ends 380. A standard return is defined as using the same medium and process to return the item as was used for the original presentment. Based on the fact that the payor bank cannot produce the electronic data required for an electronic return, it is assumed that the original presentment was a paper item and therefore the return is assumed to be done with the original paper item used for presentment.

If in decision step 350 it is determined the payor bank is capable of producing the electronic data required for the return process 389 then in decision step 390 it is determined if the bank of first deposit is capable of retrieving and/or receiving in file format and processing electronic data involved in the return item early notification process. The ability to receive or retrieve electronic data for return item early notification and/or processing is dependent on the bank of first deposits' and or payor banks' state of computer literacy and the amount/type of equipment and manpower to support such receipt of electronic data. If in step 390 the bank of first deposit is not capable of retrieving and/or receiving and processing electronic return early notification data 399 the payor bank does a standard return item and notification 400, produces the reporting and settlement advises required by the current non-inventive return process 410, and the process ends 420. In this case the fact that the bank of first deposit cannot receive electronic data/images for the return does not mean that the original presentment was not an electronic presentment using electronic data and/or an electronic image of the item originally presented to the payor bank for payment. If the original presentment was a paper item then the paper item is returned to the bank of first deposit. If however, the original presentment was done using electronic data and/or an image of the item being presented, the invention enables the payor bank to print an image replacement document (IRD) from the original data for the item image and send the IRD through the normal paper item return process to the bank of first deposit. The IRD can either be printed at the payor bank's site or the invention enables the routing of the IRD information to one of a number of remotely dispersed printers and printed on a printer that is closest to the bank of first deposit. The inventive feature of routing and printing an IRD on a printer located close to the bank of first deposit enables extremely rapid return of paper items to banks not capable of receiving electronic data/images.

If in returning to decision step 390 the bank of first deposit can receive electronic data/item image of the return item and use such information to process the item through their return procedures 429, the payor bank must then proceed to identify the data and build an electronic record/file required to process the return item electronically. The data structure for the return item notification file in one embodiment comprises retrieving an item return reason 430, an identity of the bank of first deposit 440, the item tracking number 450 from the original physical capture of the item (if it is available), an image archival storage system tracking number 460 (if the item image is stored on an archival storage system), etc. While the forgoing information is offered as example of the types of information that would need to be supplied in a data structure for processing of the return item notification it is not meant to be a comprehensive list. It should be understood that whatever information is required, in this instance and all other such instances herein, by the bank of first deposit and/or federal return item notification processing regulations will be supplied in order to satisfy processing and regulatory requirements.

After the correct data has been built into a data file 470 the file is sent to the first processor 130 for verification and processing 480. The first processor 130 may either be located at the payor bank location or at a location remote from the payor bank. In either case, and in all other such occurrences herein, the formatted file is sent through electronic communications means used in the computer industry including direct connection, satellite, telecommunications lines (either direct transmission or over the Internet/intranet), etc. In addition, transmission and storage of data at all levels in the invention is done fully utilizing various convenient transmission protocols as well as industry and proprietary data encryption to ensure the maximum security while transmitting and storing significant amounts of monetary data. In addition, system logging, application logging, audit logging, and reporting on all logged events at all levels of logging is built into functional areas of the invention to ensure the ability to totally track and report on all system and applications processes and events. Also, all transmission functionality of the invention includes automated and manual restart recovery ability at the item level to ensure minimal loss of data in case of a transmission failure.

After the first processor 130 receives the data 480, it executes the data review and correction process 132 to edit the data 490 and verify that it is complete and correct for further processing and presentment to the bank of first deposit. The data review and correction process 132 in the first processor 130 edits and scrutinizes the data based on predetermined criteria that is programmed into the first processor at installation time and changed as needed to accommodate changes in data or transmission requirements. This data can include, but is not limited, is the item image correctly formatted based on various image criteria, is all of the data required for processing the electronic notification and return included in the data record (i.e., are the required data fields in the data structure completed), is the bank of first deposit designation in that data field identifiable in a list of bank of first deposit identifiers, etc. The invention is designed such that there may be one or many first processors. The data load going into first processors 130 in all areas of the invention is automatically adjusted for load balancing and performance purposes such that data is automatically sent from any participating payor bank to the first processor that is best able to process the early return notification in the most timely manner. The first processor 130 ensures that all of the data required for correctly processing the early return notification is present, complete, and correct 500.

If the data is not present, correct, or complete 509, the invention is designed to identify this fact and initiate the communication process 131 to notify the payor bank 510 that the data is not correct or complete and that the payor bank should correct the errors, rebuild the file and resubmit the file in accordance with the invention processes and procedures 520. The invention is designed such that the notification of the payor banks 510 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 510 and that they need to correct the data and resubmit it to be processed by the invention 520, the process ends in step 530. When the payor bank has corrected the data, they resubmit it into the beginning processes of the invention in step 200.

If in returning to decision step 500 the data is present and complete 539, the data is to be submitted to a central processor for further verification of data and further processing 540. Accordingly, a central processor selection process 133 is executed to select an appropriate central processor 140 based on a criteria. By way of example but not by way of limitation, the criteria could be one of the location of a bank of first deposit designated in a field of the return item notification file, or the location of a printer that services that designated bank of first deposit, or based on load balancing requirements at the time of processing. The selected central processor 140 may be either located at the payor bank location or at a location remote from the payor bank. In either case, the formatted file is sent through normal electronic communications means common in the computer industry including direct connection, satellite, telecommunications lines (either direct transmission or over the Internet/intranet), etc. After the central processor receives the data, it edits the data 550 and verifies that it is complete and correct for further processing and presentment to the bank of first deposit. This editing data is based on the same criteria as the data editing based in the first processor and ensures that no changes were made to the data or that data was not lost during the transmission process.

The central processor then executes the data review and correction process 142 to edit and scrutinize the data based on predetermined criteria that is programmed into the central processor at installation time and changed as needed to accommodate changes in data or transmission requirements. The data editing process includes validating such information as whether the route and transit number is present and correct on all items contained in the data file, is the payor bank identified for each item being returned, is the return reason included on each item being returned, etc. The invention is designed such that there may be one or many central processors. The data load going into central processors in all areas of the invention is automatically adjusted for load balancing and performance purposes such that data is automatically sent from any participating first processor to the central processor that is best able to process the early return notification in the most timely manner. The central processor ensures that all of the data required for correctly processing the early return notification is present, complete, and correct 550.

If the data is not present, correct, or complete 569 the data review and correction process 142 identifies this fact and causes the communications process 141 to execute notify the payor bank 570 that the data is not correct or complete and that the payor bank should correct the errors, rebuild the file and resubmit the file in accordance with the invention processes and procedures 580. The invention is designed such that the notification of the payor banks 570 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 570 and that they need to correct the data and resubmit it to be processed by the invention 580, the process ends in step 590. When the payor bank has corrected the data they resubmit it into the beginning processes of the invention in step 200.

If in stepping back to decision step 560 the central processor has determined that the data is present, correct, and complete 599, the central processor continues with processing the data and preparing it to be presented to the bank of first deposit. This begins in step 600 where a sort and batch process 143 is executed to sort the return item early notification data records by bank of first deposit identification. This will enable all of the return item notification records to be sent to the bank of first deposit in a batch. Batching of items to be returned to a specific bank of first deposit can be done by batching all of the items being returned from a specific payor bank and sending those items to the specific bank of first deposit. As an alternative, the batching process can batch all items that are being returned from any and/or all payor banks, and that are being sent to a specific bank of first deposit, into a single batch and sending this batch to the specific bank of first deposit. The sorting process can be accomplished in two different manners determined by a system parameter set at installation time and changed as the need arises. The first option is to transmit the data records to a MICR capture and routing system. These systems are set up with routing tables that easily accommodate identifying and sorting the data records by bank of first deposit. After the MICR system has sorted the return records into order by bank of first deposit, the records are transmitted back to the central processor for further processing and transmission to the bank of first deposit. This option is a batch process that is controlled by the central processor and is done on a periodic basis as enough return records are accumulated in the central processor to make this an efficient process. The number of records required to make this an efficient operation is based on the equipment and communications facilities being used and is an installation option of the invention that can be changed as the need arises. After the items are returned by the MICR capture system to the central processor they can be selectively stored in a data file until sufficient records have stored to efficiently transmit the data records to the bank of first deposit. Alternatively, the central processor can be selectively configured to send the data records to the appropriate bank of first deposit as soon as they are returned from the MICR processing system.

The second method of sorting the return records into order by the bank of first deposit is to use the real time sorting option built into the central processor. This method involves creating sort tables within the central processor that identifies where the routing or return records based on the-bank of first deposit identifier in the return record. These tables are set up at installation time and changed as the need arises. Using this method of sorting items to the bank of first deposit the data records can selectively be accumulated at the central processor until a number of records have been accumulated and the data file can then be transmitted to the bank of first deposit. Alternatively, to facilitate rapid notification of a return item, each data record can be sent as soon as the bank of first deposit has been identified on the record.

The foregoing description of the batching and transmitting is consistent in all cases where batching is referred to herein. Using this method of sorting items to the bank of first deposit the data records can selectively be accumulated in a data file until a number of records have been accumulated and the data file can then be transmitted to the bank of first deposit. Alternatively, to facilitate rapid notification of a return item, each data record can be sent as soon as the bank of first deposit has been identified on the record.

The invention includes the ability to review the status of and make changes to any and all system parameters and data in all components of the system from the administration component of the system. This component is an on-line real time system feature (including access through dial-up, leased lines, intranet, and internet connections) that allows authorized individuals to selectively view, add, change, and update system information, data, and parameters based on the individuals authorization level. In addition, access to all on-line components if the system is done using password and biometric authentication.

After the data records have been sorted in bank of first deposit order 600 the central processor formats a file 610 that will be sent to the Federal Reserve Bank (FRB), or other financial authority if the invention is being run in a foreign country, notifying them of the item being returned. This file is formatted and transmitted 620 to the appropriate authority in accordance with the regulations (domestic or foreign) governing this activity. The central processor then formats the file to be sent to the bank of first deposit 630 and transmits the return item data record(s) to the bank of first deposit 640. After the return notification and/or return data record(s) and/or printed items and/or actual physical return items are received by the bank of first deposit, the bank of first deposit sends an acknowledgement 645 back to the payor bank of successful receipt of return notification data and/or items. This receipt acknowledgement is an integral part of the inventive process and is done using the features and functionality of the inventions remote site, Central, and First processors. In practical terms, and all other such instances as described in further embodiments and contained herein, the bank of first deposit can send an electronic acknowledgement to the payor, said acknowledgement comprising an electronic record being transmitted to the payor bank through the remote site, Central and First processors of the invention via dial or leased telecommunications lines or via an internet connection or any other electronic communications facility commonly used for such communications. As an alternative embodiment of the acknowledgment functionality, the invention's on-line administration component has the ability to allow the bank of first deposit to access the administration component of the invention and enter acknowledgement information. The invention will then either allow the payor bank to log onto the administration component of the invention to receive said acknowledgement information, or as another alternative, the invention will format the acknowledgment information entered on line by the bank of first deposit and send an electronic acknowledgement of receipt of the return notification and/or return to the payor bank via dial or leased telecommunications lines or via an internet connection or any other electronic communications facility commonly used for such communications. Alternatively or in addition, the bank of first deposit could send web content to a client device for the payor bank with a notification of the return acknowledgement, which notification may include data for the image item or a link to the image item in archival storage. The notification process could also include an email to the client device to refresh its web site to include/display the notification acknowledgement.

After acknowledgement receipt is sent 645, reports and settlement advises are generated 650 to cover the process of returning items to the bank of first deposit. This generation of an item to ensure that the funds are transferred appropriately is commonly known as settlement and is done in accordance with the further description of settlement contained herein. When settlement items are generated the total settlement amount on each advice is determined by the batching process as described herein. In the one circumstance, the settlement item can be a summing of all the items being batched and returned to any bank of first deposit from a particular payor bank. An alternative embodiment allows for the settlement item to be created by summing the amount of all items being batched and returned to a specific bank of first deposit from all payor banks returning items through the invention to the specific bank of first deposit.

In decision step 660 the bank of first deposit must make a decision to either return the item(s) to the initial depositor or re-present the item to the payor bank again for payment. This decision is made by the bank of first deposit based on the bank of first deposit's internal policies of how many times to re-present an item for payment. As described in the re-present-ment process at the payor bank re-presented in steps 210, 220, 230, 240, and 250, the payor bank can have an agreement with the bank of first deposit to re-present the item to the check payor a given number of times prior to the payor bank sending the item to the bank of first deposit. However, if the bank of first deposit does not have such an agreement with the payor bank, and if the bank of first deposit decides to re-present the item to the payor bank for payment 689, then the bank of first deposit re-presents the item to the payor bank 690 using the reverse process involved in this return item early notification system. This invention works such that item images and data can flow both directions for either return or re-presentment purposes beginning when the Bank of First Deposit 160 or Depositor 170 (through the Bank of First Deposit 160) decide to re-present an item image to the payor which is done through the reverse path of sending the re-presented item to the Remote Site Processor 190 to the Central Processor 140 to the First Processor 130 to re-present the item image to the Payor Bank 110 which in returns charges the Check Payor's 120 account at the Bank of First Deposit 110. This re-presentment process uses all of the same inventive features, functionality, and processes as the return item process described herein. When the item has been re-presented to the payor bank 690, the return process ends 700 for this instance and begins again on any particular represented item in step 200.

If in returning to decision step 660 the bank of first deposit decides to not re-present the item to the payor bank for payment 669, the bank of first deposit returns the item to the original depositor 670 using the paper item that was sent back to bank of first deposit by the payor bank after the return item early notification data was sent to the bank of first deposit. If the item image or paper item is not required to affect the return process, the return to the depositor would then involve the bank of first deposit charging the item against the depositors account, notifying the depositor of the return, providing the depositor with the information involving the return, and at the depositor's request providing the data in the return record to enable the depositor to return the item to the party that gave them the original check. This notification could entail the bank of first deposit could sending web content to a client device for the depositor with a notification of the return, which notification may include data for the image item or a link to the image item in archival storage. The notification process could also include an email to the client device to refresh its web site to include/display the notification. The process then ends in process step 680.

In returning to decision step 340, if an image or paper item is required to complete the return item early notification process 709, then in step 710 it is determined if the original presentment to the payor bank was done with an image. In any instance in this process where a determination is made that an item was originally presented using an image of the original physical item, additional check item and bank of first deposit data also accompanied the image. If the presentment was not done with an item image 719 then the original presentment was done using a paper item and in decision step 720 it is determined if the payor bank has the ability to create an image from the paper item. The ability of the payor bank to create an image from a paper item is dependent on the payor bank having the computer equipment, software and a reader device capable of being used to create a paper image duplicate of an original paper item. If in decision step 720 the payor bank does not have the ability to create an image from a paper item 729, then the payor bank does a standard paper return item return and notification 730, produces the necessary reports and settlement 740 in accordance with the current reporting and settlement regulations and the return process ends 750. Returning to decision step 720, if the payor bank does have the ability to create a return item image from a paper item 759, then in decision step 760 it is determined if the bank of first deposit has the ability to accept and/or retrieve from a file or bulletin board an electronic return item early notification (including either the electronic data and/or the electronic data and an image of the original physical item). If the bank of first deposit does not have the ability to receive/process an electronic return item early notification 769, then in step 770 the payor bank does the standard notification and return, produces the appropriate reports and settlement 780 in accordance with the current reporting and settlement regulations and the return process ends in step 790. To facilitate the standard settlement process a settlement advise is prepared by the central processor and presented to the bank of first deposit, the payor bank, and any regulatory authority (such as the Federal Reserve Bank) as needed to ensure that the funds re-presented by the standard return item are settled in accordance with the further description of settlement contained herein.

If in returning to decision step 760 it is determined that the bank of first deposit has the ability to accept and/or retrieve (from a data file or bulletin board) an electronic data/image return item early notification and use such information to process the item through their return procedures, the payor bank must then proceed to identify the data and build an electronic file required to process the return item electronically. As noted earlier, the data structure for this file could include the fields for the item return reason 800, identifying the bank of first deposit 810, the item tracking number from the original physical capture of the item 820 (if available). The item image is then created 830 to be included in the return item notification process. While the forgoing information is offered as example of the types of information that would need to be supplied for processing of the return item notification, it is not meant to be a comprehensive list. It should be understood that whatever information is required by the bank of first deposit and/or federal return item notification processing regulations will be supplied in order to satisfy processing and regulatory requirements.

After the correct data has been built into a data file 840 the file is sent to a first processor for verification and processing 850. The first processor 130 may either be located at the payor bank location or at a location remote from the payor bank. In either case, the formatted file is sent through electronic means as previously described.

After the first processor 130 receives the data, it executes the data review and correction process 133, to edit the data 860 and verify that it is complete and correct for further processing and presentment to the bank of first deposit. This process in the first processor edits and scrutinizes the data based on predetermined criteria that is programmed into the first processor at installation time and changed as needed to accommodate changes in data or transmission requirements. The invention is designed such that there may be one or many first processors 130. The data load going into first processors in all areas of the invention is automatically adjusted for load balancing and performance purposes such that data is automatically sent from any participating payor bank to the first processor that is best able to process the early return notification in the most timely manner. The first processor 130 ensures that all of the data required for correctly processing the early return notification is present, complete, and correct 870.

If the data is not present, correct, or complete 879, the invention is designed to identify this fact and notify the payor bank 880 by initiating the communications process 131 with the payor bank that the data is not correct or complete and that the payor bank should correct the errors, rebuild the file and resubmit the file in accordance with the invention processes and procedures 890. The invention is designed such that the notification of the payor banks 880 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 880 and that they need to correct the data and resubmit it to be processed 890, the appropriate reports are created 900 and the process ends in step 910. When the payor bank has corrected the data, they resubmit it into the beginning processes of the invention in step 200.

If in step 870 the data is present and complete 919, the data is submitted to a central processor 140 for further verification of data and further processing 920. Where there is more than one central processor available, the first processor 130 would execute the central processor selection process 133 to select a central processor 140 based on a criteria, such as location of the bank of first deposit, location of a printer servicing the bank of first deposit, processor load criteria, or other convenient criteria, as noted previously. The central processor 140 may either be located at the payor bank location or at a location remote from the payor bank. In either case, the formatted file is sent through normal electronic communications means common in the computer industry including direct connection, satellite, telecommunications lines (either direct transmission or over the Internet/Intranet), etc. After the central processor receives the data, it will execute its data review and correction process 142 to edit the data 930 and verify that it is complete and correct for further processing and presentment to the bank of first deposit.

The central processor 140 edits and scrutinizes the data based on predetermined criteria that is programmed into the central processor at installation time and changed as needed to accommodate changes in data or transmission requirements. The invention is designed such that there may be one or many central processors 140. The data load going into central processors in all areas of the invention is automatically adjusted for load balancing and performance purposes such that data is automatically sent from any participating first processor to the central processor that is best able to process the early return notification in the most timely manner. The central processor 140 ensures that all of the data required for correctly processing the early return notification is present, complete, and correct 930.

If the data is not present, correct, or complete in query step 940, the invention is designed to identify this fact 949 and notify the payor bank 950 that the data is not correct or complete and that the payor bank should correct the errors, rebuild the file and resubmit the file in accordance with the invention processes and procedures 960. The invention is designed such that the notification of the payor banks 950 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 950 and that they need to correct the data and resubmit it to be processed by the invention 960, appropriate reports are created 970 and the process ends in step 975. When the payor bank 110 has corrected the data, they resubmit it into the beginning processes of the invention in step 200.

In stepping back to decision step 940, if the central processor 140 has determined that the data is present, correct, and complete 979, the central processor continues with processing the data and preparing it to be presented to the bank of first deposit. This begins in step 980 by executing sorting and batching process 143, wherein the return item early notification data records are sorted by bank of first deposit identification. This will enable all of the return item notification records to be sent to the bank of first deposit in a batch. Batching of items to be returned to a specific bank of first deposit can be done by batching all of the items being returned from a specific payor bank and sending those items to the specific bank of first deposit. As an alternative, the batching process can batch all items that are being returned from any and/or all payor banks, and that are being sent to a specific bank of first deposit, into a single batch and sending this batch to the specific bank of first deposit. The sorting process can be accomplished in two different manners determined by a system parameter set at installation time and changed as the need arises. Note that the sort and batching steps may be deleted and each return item notification file sent directly to the designated bank of first deposit, if desired. After the data records have been sorted in bank of first deposit order 980, the central processor formats a file 990 that will be sent to the Federal Reserve Bank (FRB), or other financial authority if invention is being run in a foreign country, notifying them of the item being returned. This file is formatted and transmitted 1000 to the appropriate authority in accordance with the regulations (domestic or foreign) governing this activity. The central processor 140 then formats the file to be sent to the bank of first deposit 1010 and transmits the return item data file(s) to the bank of first deposit 1020. After the return notification and/or return data file(s) and/or printed items and/or actual physical return items are received by the bank of first deposit, the bank of first deposit sends an acknowledgement 1025 back to the payor bank of successful receipt of return notification data and/or items. This receipt acknowledgement is an integral part of the inventive process and is done using the features and functionality of the inventions remote site, Central and First processors. The specific functionality involved in the receipt acknowledgement in this case is consistent with the description of receipt functionality previously described herein.

After acknowledgement receipt is sent 1025, the settlement process 145 is executed to generate reports and settlement advises 1030 to cover the process of returning items to the bank of first deposit. At this point the original paper items are forwarded to the bank of first deposit 1040, if needed as described herein, to complete the return item process. Also, at this point a paper or electronic item is prepared and presented to the bank of first deposit, the payor bank, and any regulatory authority (such as the Federal Reserve Bank) as needed to ensure that the funds represented by the Return Item Early Notification process are transferred appropriately. This presentation of an item to ensure that the funds are transferred appropriately is commonly known as settlement and is done in accordance with the further description of settlement contained herein. When settlement items are generated, the total settlement amount on each advice is determined by the batching process as described herein. In one embodiment, the settlement item can be a summing of all the items being batched and returned to any bank of first deposit from a particular payor bank. An alternative embodiment allows for the settlement item to be created by summing the amount of all items being batched and returned to a specific bank of first deposit from all payor banks returning items through the invention to the specific bank of first deposit.

In step 1050 the bank of first deposit must make a decision to either return the item(s) to the initial depositor or re-present the item to the payor bank again for payment. This decision is made by the bank of first deposit based on the bank of first deposit's internal policies of how many times to re-present an item for payment. As described in the re-presentment process at the payor bank represented in steps 210, 220, 230, 240, and 250, the payor bank can have an agreement with the bank of first deposit to re-present the item to the check payor a given number of times prior to the payor bank sending the item to the bank of first deposit. However, if the bank of first deposit does not have such an agreement with the payor bank, and if the bank of first deposit decides to re-present the item to the payor bank for payment 1079 then the bank of first deposit re-presents the item to the payor bank 1080 using the reverse process involved in this return item early notification system beginning when the Bank of First Deposit 160 or Depositor 170 (through the Bank of First Deposit 160) decide to re-present an item image to the payor. This comprises in one embodiment using a reverse path of sending the re-presented item to a Remote Site Processor 190 (which includes a communications process 191, a data review and correction process 192, a central processor selection process 193, and a sorting and batching process 194) to a Central Processor 140, to the first processor 130 to re-present the item image to the Payor Bank 110, which in turn charges the Check Payor's 120 account at the payor bank 110. This re-presentment process uses all of the same inventive features, functionality, and processes as the return item process described herein. The invention has been designed such that item images and data can flow both directions for either return or re-presentment purposes. When the item has been re-presented to the payor bank 1080 the return process ends 1090 for this instance and begins again on any particular re-presented item in step 200.

If in step 1050 the bank of first deposit decides to not re-present the item to the payor bank for payment 1059, the bank of first deposit returns the item to the original depositor 1060 using the paper item that was sent back to bank of first deposit by the payor bank after the return item early notification data was sent to the bank of first deposit. For future functionality based on regulations changed to accommodate an electronic notification and return, the item image or paper item is not required to affect the return process, the return to the depositor would then involve the bank of first deposit charging the item against the depositors account, notifying the depositor of the return, providing the depositor with the information involving the return, and at the depositor's request providing the data in the return record to enable the depositor to return the item to the party that gave them the original check. Note that in one embodiment of the present invention, the process may include sending to the depositor a link to data of the item image associated with the return item notification file in an archive. In a further embodiment, the display of the link may comprise a configuration such a wording or an icon indicating a reason for the return. Web content may also be sent to the depositor that present to the user a user interface to allow the depositor to input instruction to the payor bank. By way of example but not by way of limitation, the instruction could comprise an authorization to activate an overdraft loan process. The process then ends in process step 1070.

Returning back to step 710 if it is determined that original presentment to payor bank was an image item 739, then in step 1100 it is determined if the image item was placed on an archival storage system during the presentment process. If the item was not placed on an archival storage system 1109, then in decision step 1110 it is determined if the payor bank can return an image instead of the paper item. If the payor bank does not have the ability to create an image from a paper document to facilitate an electronic image return item early notification, then the payor bank does a standard return item and standard notification 1120. The standard return includes the return of the physical item that is not being paid by the check payor and the normal notification of the Federal Reserve Bank (FRB) (or any other financial authority if the return involves a foreign country) of returning the item to the bank of first deposit. After the payor bank does the standard return 1120, the payor bank produces reporting and settlement 1125 associated with the return item decision and in accordance with the current reporting and settlement regulations and the process ends 1130. To facilitate the standard settlement process a settlement advise is prepared by the central processor by executing the settlement process 145 and presented to the bank of first deposit, the payor bank, and any regulatory authority (such as the Federal Reserve Bank) as needed to ensure that the funds re-presented by the standard return item are settled in accordance with the further description of settlement contained herein.

Returning to step 1110 if it is determined that the item being returned is on an item image archival storage system 1139, then payor bank proceeds to identify the data and build an electronic file required to process the return item electronically. Such information as the item return reason 1140, identifying the bank of first deposit 1150, the item tracking number from the original physical capture of the item 1160 (if available) in archival storage, and creates an item image from the paper original 1170.

After the correct data has been built into a data file 1180, the file is sent to a first processor 130 for verification and processing 1190. The first processor may either be located at the payor bank location or at a location remote from the payor bank. In either case, the formatted file is sent through normal electronic means as previously described. After the first processor 130 receives the data, it executes the data review and correction process 130 to edit the data 1200 and verify that it is complete and correct for further processing and presentment to the bank of first deposit. The first processor edits and scrutinizes the data based on predetermined criteria that is programmed into the first processor at installation time and changed as needed to accommodate changes in data or transmission requirements. The invention is designed such that there may be one or many first processors. The data load going into first processors in all areas of the invention is automatically adjusted for load balancing and performance purposes such that data is automatically sent from any participating payor bank to the first processor that is best able to process the early return notification in the most timely manner. The first processor 130 ensures that all of the data required for correctly processing the early return notification is present, complete, and correct relative to selected criteria 1210.

If the data is not present, correct, or complete 1219 the invention is designed to identify this fact and execute the communications process 131 to notify the payor bank 1220 that the data is not correct or complete and that the payor bank should correct the errors, rebuild the file and resubmit the file in accordance with the invention processes and procedures 1230. The invention is designed such that the notification of the payor banks 1220 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 1220 and that they need to correct the data and resubmit it to be processed by the invention 1230, the appropriate reports are created 1240 and the process ends in step 1250. When the payor bank has corrected the data they resubmit it into the beginning processes of the invention in step 200.

If in step 1210 the data is present and complete 1259 the central processor selection process 133 is executed as discussed previously where more than one central processor is in the system, and the communications process 131 is executed to submit the data to a selected central processor 140 for further verification of data and further processing 1260. The central processor may either be located at the payor bank location or at a location remote from the payor bank. In either case, the formatted file is sent through normal electronic communications means common in the computer industry including direct connection, satellite, telecommunications lines (either direct transmission or over the Internet/Intranet), etc. After the central processor receives the data, it executes the data review and correction process 142 to edit the data 1265 and verify that it is complete and correct for further processing and presentment to the bank of first deposit. The central processor edits and scrutinizes the data based on predetermined criteria that is programmed into the first processor at installation time and changed as needed to accommodate changes in data or transmission requirements. The invention is designed such that there may be one or many central processors 140. The data load going into central processors in all areas of the invention is automatically adjusted for load balancing and performance purposes such that data is automatically sent from any participating first processor to the central processor that is best able to process the early return notification in the most timely manner. The central processor 140 ensures that all of the data required for correctly processing the early return notification is present, complete, and correct at least in accordance with certain criteria 1270.

If the data is not present, correct, or complete 1279, the invention is designed to identify this fact and notify the payor bank 1280 that the data is not correct or complete and that the payor bank should correct the errors, rebuild the file and resubmit the file in accordance with the invention processes and procedures 1290. The invention is designed such that the notification of the payor banks 1280 is done using the communications process 141 that may encompass a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 1280 and that they need to correct the data and resubmit it to be processed by the invention 1290, appropriate reports are created 1295 and the process ends in step 1300. When the payor bank has corrected the data they resubmit it into the beginning processes of the invention in step 200.

In stepping back to step 1270 if the central processor has determined that the data is present, correct, and complete 1309, the central processor continues with processing the data and preparing it to be presented to the bank of first deposit. This begins in step 1310 where the sorting and batch process 143 is executed so that the return item early notification data records are sorted by bank of first deposit identification. This will enable all of the return item notification records to be sent to the bank of first deposit in a batch. Batching of items to be returned to a specific bank of first deposit can be done by batching all of the items being returned from a specific payor bank and sending those items to the specific bank of first deposit. As an alternative, the batching process can batch all items that are being returned from any and/or all payor banks, and that are being sent to a specific bank of first deposit, into a single batch and sending this batch to the specific bank of first deposit. The sorting process can be accomplished in two different manners determined by a system parameter set at installation time and changed as the need arises. Note that the sorting and batch process is optional and can be replaced by multiple direct transmissions directly or indirectly to the designated banks of first deposit.

After the data records have been sorted in bank of first deposit order 1310, the central processor formats a file 1320 that will be sent to the Federal Reserve Bank (FRB), or other financial authority if the invention is being run in a foreign country or if a return is being done to a bank of first deposit in a foreign country, notifying them of the item being returned. This file is formatted and transmitted 1330 to the appropriate authority in accordance with regulations governing this activity. The central processor 140 then formats the file to be sent to the bank of first deposit 1340 and transmits the return item data record(s) to the bank of first deposit 1350. After the return notification and/or return data record(s) and/or printed items and/or actual physical return items are received by the bank of first deposit, the bank of first deposit sends an acknowledgement 1355 back to the payor bank of successful receipt of return notification data and/or items. This receipt acknowledgement is an integral part of the inventive process and is done using the features and functionality of the invention's, remote processor 190, central processor 140, and first processor 130. The specific functionality involved in the receipt acknowledgement in this case is consistent with the description of receipt functionality previously described herein. In practical terms, the bank of first deposit can either send an electronic acknowledgement to the payor, said acknowledgement comprising an electronic record being transmitted to the payor bank through the central and first processors of the invention via dial or leased telecommunications lines or via an internet connection or any other electronic communications facility commonly used for such communications. As an alternative embodiment of the acknowledgment functionality, the invention's on-line administration component has the ability to allow the bank of first deposit to access the administration component of the invention and enter acknowledgement information. The invention will then either allow the payor bank to log onto the administration component of the invention to receive said acknowledgement information, or as another alternative, the invention will format the acknowledgment information entered on line by the bank of first deposit and send an electronic acknowledgement of receipt of the return notification and/or return to the payor bank via dial or leased telecommunications lines or via an internet connection or any other electronic communications facility commonly used for such communications. Alternatively or in addition, the bank of first deposit could send web content to a client device for the payor bank with a notification of the return acknowledgement, which notification may include data for the image item or a link to the image item in archival storage. The notification process could also include an email to the client device for the payor bank to refresh its web site to include/display the notification acknowledgement.

After acknowledgement receipt is sent 1355, reports are generated 1360 to cover the process of returning items to the bank of first deposit. At this point the paper items are forwarded to the bank of first deposit 1370, if needed as described herein, to complete the return item process. Also, at this point a paper or electronic item is prepared and presented to the bank of first deposit, the payor bank, and any regulatory authority (such as the Federal Reserve Bank) as needed to ensure that the funds re-presented by the Return Item Early Notification process are transferred appropriately. This presentation of an item to ensure that the funds are transferred appropriately is commonly known as settlement and is done in by executing the settlement process 145 in accordance with the further description of settlement contained herein. When settlement items are generated the total settlement amount on each advice is determined by the batching process as described herein. In the one circumstance, the settlement item can be a summing of all the items being batched and returned to any bank of first deposit from a particular payor bank. An alternative embodiment allows for the settlement item to be created by summing the amount of all items being batched and returned to a specific bank of first deposit from all payor banks returning items through the invention to the specific bank of first deposit.

In step 1380 the bank of first deposit 160 must make a decision to either return the item(s) to the initial depositor or re-present the item to the payor bank again for payment. This decision is made by the bank of first deposit based on the bank of first deposit's internal policies of how many times to re-present an item for payment. As described in the re-presentment process at the payor bank represented in steps 210, 220, 230, 240, and 250, the payor bank can have an agreement with the bank of first deposit to re-present the item to the check payor a given number of times prior to the payor bank sending the item to the bank of first deposit. However, if the bank of first deposit does not have such an agreement with the payor bank, and if the bank of first deposit decides to re-present the item to the payor bank for payment 1409, then the bank of first deposit re-presents the item to the payor bank 1410 using the reverse process involved in this return item early notification system beginning when the Bank of First Deposit 160 or Depositor 170 (through the Bank of First Deposit 160) decide to re-present an item image to the payor which is done through the reverse path of sending the re-presented item to the Remote Processor 190 to the Central Processor 140 to the First Processor 130 to re-present the item image to the Payor Bank 110, which in turn charges the Check Payor's 120 account at the Bank of First Deposit 110. This re-presentment process uses all of the same inventive features, functionality, and processes as the return item process described herein. The invention has been designed such that item images and data can flow both directions for either return or re-presentment purposes. When the item has been re-presented to the payor bank 1410, the return process ends 1420 for this instance and begins again on any particular represented item in step 200.

If in step 1380 the bank of first deposit decides to not re-present the item to the payor bank 1389 for payment, the bank of first deposit returns the item to the original depositor 1390 using the paper item that was sent back to bank of first deposit by the payor bank after the return item early notification data was sent to the bank of first deposit. Alternatively, or for future functionality based on regulation changes to accommodate an electronic notification and return process, and if the item image or paper item is not required to affect the return process, the return to the depositor could then involve the bank of first deposit charging the amount of the item against the depositors account, notifying the depositor of the return charge, providing the depositor with the information involving the return, and at the depositor's request providing the data in the return record to enable the depositor to return the item to the party that gave them the original check. This notification could entail the bank of first deposit sending web content to a client device for the depositor with a notification of the return, which notification may include data for the image item or a link to the image item in archival storage. The notification process could also include an email to the client device to refresh its web site to include/display the notification. The process then ends in process step 1400.

If in returning to step 1100 it is determined that the original image item was placed on an archival storage system 1429 during the presentment process, then the return item early notification process continues by the payor bank then proceeding to identify the data and build an electronic return item notification file with a data structure required to process the return item electronically. The data structure would include such information as the item return reason 1430, identifying the bank of first deposit 1440, the item tracking number from the original physical capture of the item 1450 (if available) in archival storage, an image archival storage system tracking number 1460, etc. After the correct data has been built into a data file 1470, the file is sent to a first processor 130 for verification and processing 1480. The first processor 130 may either be located at the payor bank location or at a location remote from the payor bank. In either case, the formatted file is sent through normal electronic means as previously described. After the first processor receives the data, it executes the data review and correction process 132 to edit the data 1490 and verify that it is complete and correct for further processing and presentment to the bank of first deposit. The first processor edits and scrutinizes the data based on predetermined criteria that is programmed into the first processor at installation time and changed as needed to accommodate changes in data or transmission requirements. The invention is designed such that there may be one or many first processors. The data load going into first processors in all areas of the invention is automatically adjusted for load balancing and performance purposes such that data is automatically sent from any participating payor bank to the first processor that is best able to process the early return notification in the most timely manner. The first processor 130 ensures that all of the data required for correctly processing the early return notification is present, complete, and correct 1500.

If the data is not present, correct, or complete 1509 the invention is designed to identify this fact and execute the communications process 131 to notify the payor bank 1510 that the data is not correct or complete and that the payor bank should correct the errors, rebuild the file and resubmit the file in accordance with the invention processes and procedures 1520. The invention is designed such that the notification of the payor banks 1510 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 1510 and that they need to correct the data and resubmit it to be processed by the invention 1520, the process ends in step 1530. When the payor bank has corrected the data they resubmit it into the beginning processes of the invention in step 200.

If in returning to step 1500 the data is present and complete 1539, the central processor selection process is executed if there is more than one central processor in the system in order to select a central processor 140 based on a criteria, as previously discussed, and the communications process 131 is executed to submit the data to the selected central processor 140 for further verification of data and further processing 1540. The central processor may either be located at the payor bank location or at a location remote from the payor bank. In either case, the formatted file is sent through normal electronic communications means common in the computer industry including direct connection, satellite, telecommunications lines (either direct transmission or over the Internet/

Intranet), etc. After the central processor receives the data, it executes the data review and correction process 142 to edit the data 1550 and verify that it is complete and correct for further processing and presentment to the bank of first deposit.

The central processor edits and scrutinizes the data based on predetermined criteria (such as is the route and transit number present and correct on all items contained in the data file, is the payor bank identified for each item being returned, is the return reason included on each item being returned, etc.) that is programmed into the central processor at installation time and changed as needed to accommodate changes in data or transmission requirements. The invention is designed such that there may be one or many central processors. The data load going into central processors in all areas of the invention is automatically adjusted for load balancing and performance purposes such that data is automatically sent from any participating first processor 130 to the central processor that is best able to process the early return notification in the most timely manner. The central processor ensures that all of the data required for correctly processing the early return notification is present, complete, and correct 1550.

If the data is not present, correct, or complete 1560 the invention is designed to identify this fact 1569 and to execute the communication process 141 to notify the payor bank 1670 that the data is not correct or complete and that the payor bank should correct the errors, rebuild the file and resubmit the file in accordance with the invention processes and procedures 1580. The invention is designed such that the notification of the payor banks 1570 is done using a variety of methods to include bi-directional e-mail, fax, telephone call and any other electronic or manual method that is appropriate for the parties involved. The method used to notify the payor bank is a system option that is chosen at installation time and can be changed as the need arises. After the payor bank is notified that the data is not correct 1570 and that they need to correct the data and resubmit it to be processed by the invention 1580, the process ends in step 1590. When the payor bank has corrected the data they resubmit it into the beginning processes of the invention in step 200.

In stepping back to step 1560 if the central processor has determined that the data is present, correct, and complete 1599, the central processor continues with processing the data and preparing it to be presented to the bank of first deposit. This begins in step 1600 where the sort and batch process 143 is executed on the return item early notification data records to sort by bank of first deposit identification. This will enable all of the return item notification records to be sent to the bank of first deposit in a batch. Batching of items to be returned to a specific bank of first deposit can be done using the batching processes previously described in detail herein.

The invention includes the ability to make changes to any and all system parameters and data in all components of the system from the administration component of the system. This component is an on-line real time system feature that allows authorized individuals to selectively view, add, change, and update system information, data, and parameters based on the individuals authorization level. In addition, access to all on-line components if the system is done using password and biometric authentication.

After the data records have been sorted in bank of first deposit order 1600 the central processor formats a file 1610 that will be sent to the Federal Reserve Bank (FRB), or other financial authority if the invention is being run in a foreign country, notifying them of the item being returned. This file is formatted and transmitted 1620 via the communications process 141 to the appropriate authority in accordance with the regulations (domestic or foreign) governing this activity. The central processor then formats the file to be sent to the bank of first deposit 1630 and transmits the return item data record(s) to the bank of first deposit 1640. After the return notification and/or return data file(s) and/or printed items and/or actual physical return items are received by the bank of first deposit, the bank of first deposit sends an acknowledgement 1645 back to the payor bank of successful receipt of return notification data and/or items. As noted previously, this receipt acknowledgement is an integral part of the inventive process and is done using the features and functionality of the first processors and Central processors. The specific functionality involved in the receipt acknowledgement in this case is consistent with the description of receipt functionality previously described herein.

After acknowledgement receipt is sent 1645, reports are generated 1650 to cover the process of returning items to the bank of first deposit. At this point the paper items are forwarded to the bank of first deposit 1660, if needed as described herein, to complete the return item process. Also, at this point a paper or electronic item is prepared and presented to the bank of first deposit, the payor bank, and any regulatory authority (such as the Federal Reserve Bank) as needed to ensure that the funds re-presented by the Return Item Early Notification process are transferred appropriately. This presentation of an item to ensure that the funds are transferred appropriately is commonly known as settlement and is done using the settlement process 145 in accordance with the further description of settlement contained herein. When settlement items are generated, the total settlement amount on each advice is determined by the batching process as described herein. In the one circumstance, the settlement item can be a summing of all the items being batched and returned to any bank of first deposit from a particular payor bank. An alternative embodiment allows for the settlement item to be created by summing the amount of all items being batched and returned to a specific bank of first deposit from all payor banks returning items through the invention to the specific bank of first deposit.

In step 1670 the bank of first deposit must make a decision to either return the item(s) to the initial depositor or re-present the item to the payor bank again for payment. This decision is made by the bank of first deposit based on the bank of first deposit's internal policies of how many times to re-present an item for payment. As described in the re-presentment process at the payor bank re-presented in steps 210, 220, 230, 240, and 250, the payor bank can have an agreement with the bank of first deposit to re-present the item to the check payor a given number of times prior to the payor bank sending the item to the bank of first deposit. However, if the bank of first deposit does not have such an agreement with the payor bank, and if the bank of first deposit decides to re-present the item to the payor bank for payment 1699 then the bank of first deposit re-presents the item to the payor bank 1600 using the reverse process involved in this return item early notification system beginning when the Bank of First Deposit 160 or Depositor 170 (through the Bank of First Deposit 160) decide to re-present an item image to the payor which is done through the reverse path of sending the re-presented item to the Remote Processor 190 to the Central Processor 140 to the First Processor 130 to re-present the item image to the Payor Bank 110, which in returns charges the Check Payor's 120 account at the Bank of First Deposit 110. This re-presentment process uses all of the same inventive features, functionality, and processes as the return item process described herein. This system has been designed such that item images and data can flow both directions for either return or re-presentment purposes. When the item has been re-presented to the payor bank 1700, the return process ends for this instance 1710 and begins again on any particular re-presented item in step 200.

If in step 1670 the bank of first deposit decides to not re-present the item to the payor bank for payment 1679, the bank of first deposit returns the item to the original depositor 1680 using the paper item that was sent back to bank of first deposit by the payor bank after the return item early notification data was sent to the bank of first deposit. Alternatively, or for future functionality based on regulation changes to accommodate an electronic notification and return process, and if the item image or paper item is not required to affect the return process, the return to the depositor could then involve the bank of first deposit charging the amount of the item against the depositors account, notifying the depositor of the return charge, providing the depositor with the information involving the return, and at the depositor's request providing the data in the return record to enable the depositor to return the item to the party that gave them the original check. This notification could entail the bank of first deposit sending web content to a client device for the depositor with a notification of the return, which notification may include data for the image item or a link to the image item in archival storage. The notification process could also include an email to the client device to refresh its web site to include/display the notification. The process then ends in process step 1690.

In a further embodiment of the invention, a method is provided for processing electronic return items, comprising receiving directly or indirectly from a plurality of different payor banks a plurality of different electronic return notification files, each electronic return notification file in the plurality for a different bank of first deposit, each electronic return notification file including a data structure with a designated bank of first deposit, an amount, and a reference key for the return item and a return reason; sorting multiple electronic return notification files by designated bank of first deposit; sending each of a plurality of the electronic return notification files directly or indirectly to its respective designated bank of first deposit; using the reference key to access an item image of the return item stored in an archive; accessing the image data of the return item in the archive with the reference key; and causing the image data of the return item to be sent to the designated bank of first deposit in the return item notification file.

In a further embodiment, a program product is provided for processing electronic return items, comprising machine-readable program code, which when executed, cause a machine to perform the following method: receiving directly or indirectly from a plurality of different payor banks a plurality of different electronic return notification files, each electronic return notification file in the plurality for a different bank of first deposit, each electronic return notification file including a data structure with a designated bank of first deposit, an amount, and a reference key for the return item and a return reason; sorting multiple electronic return notification files by designated bank of first deposit; sending each of a plurality of the electronic return notification files directly or indirectly to its respective designated bank of first deposit; code for using the reference key to access an item image of the return item stored in an archive; accessing the image data of the return item in the archive with the reference key; and causing the image data of the return item to be sent to the designated bank of first deposit in the return item notification file.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and generally on designer choice. It is understood that all such variations are within the scope of the invention. Likewise, software and web implementation of the present invention could be accomplished with current and future programming techniques with rule based logic and other logic to accomplish the various database searching steps, correlation steps, comparison steps, decision steps, and query and response steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system for processing electronic return items, comprising:

a plurality of first electronic processors, each of the first electronic processors including a sorting function, and each programmed to electronically receive a different plurality of electronic return item notification files from a different plurality of payor banks, each electronic return item notification file including a data structure with a designated bank of first deposit and electronic reproduction data for at least an entire front face of the return item, wherein each of a plurality of the electronic return item notification files designates a different bank of first deposit, wherein each of the first electronic processors is programmed to process the different electronic return item notification files received thereby; and a plurality of central processing systems, each of the central processing systems programmed to receive and process different electronic return item notification files received thereby from a plurality of different first electronic processors in advance of and separate from magnetic ink character recognition (MICR) capture, deposit accounting, cash management, and float processing systems of the respective banks of first deposit designated in the different electronic return item notification files, wherein the first electronic processors are programmed to determine based on at least one criterion, for each of a respective different plurality of the given electronic return item notification files received thereby, at least one of the central processing systems from among the plurality of central processing systems at different locations to which to send the electronic return item notification file, wherein the central processing systems are programmed to electronically process in advance of the MICR capture, deposit accounting, cash management, and float processing systems of the respective banks of first deposit designated the plurality of electronic return item notification files received thereby, wherein processing comprises at least one of error checking, and sorting, and retrieval of data from an electronic archive based on information in the electronic return item notification file, wherein the central processing systems are programmed to transmit after processing each of a plurality of the electronic return item notification files directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

2. The system as defined in claim 1, wherein the first electronic processors are programmed to determine the central processor system based on at least one from the group of a table matching a bank of first deposit designated in the return item notification file to a given central processing system, a volume of return item notification files being processed and a location of a printer that services the bank of first deposit designated in the return item notification file.

3. The system as defined in claim 1, further comprising:
the central processing systems programmed to add amounts from a plurality of return items for a designated bank of first deposit to obtain a sum for the designated bank of first deposit, generate in advance of the designated bank of first deposit systems an electronic settlement document using the sum, and send the electronic settlement document directly or indirectly to the designated bank of first deposit with the electronic return item notification files.

4. The system as defined in claim 1, wherein the central processing systems are programmed to send web content to a web client at a remote site to provide the electronic reproduction data for at least the front face of return item or a link thereto.

5. A program product for processing electronic return items, comprising:
at least one computer-readable medium having program code embodied therein or among them if more than one computer-readable medium, capable of causing, when executed, machines in a network comprising a plurality of first electronic processors programmed to electronically receive electronic return item notification files from a plurality of payor banks, each electronic return item notification file including a data structure with a designated bank of first deposit and electronic reproduction data for at least an entire front face of the return item, each of the first electronic processors programmed at least for a sorting function, and a plurality of central processing systems, each of the central processing systems programmed to receive and process different electronic return item notification files received from a plurality of different first electronic processors in advance of and separate from magnetic ink character recognition (MICR) capture, deposit accounting, cash management, and float processing systems of the respective banks of first deposit designated in the different electronic return item notification files, to perform the following method steps:
receiving electronically by each of a plurality of the first electronic processors a different plurality of electronic return item notification files from a different plurality of payor banks, wherein each of a plurality of the electronic return item notification files designates a different bank of first deposit;

processing by the first electronic processors the different electronic return item notification files received thereby;
determining by the first electronic processors based on at least one criterion, for each of a respective different plurality of the given electronic return item notification files received thereby, at least one of the central processing systems from among the plurality of central processing systems at different locations to which to send the electronic return item notification file;
processing electronically by the respective central processing systems in advance of the MICR capture, deposit accounting, cash management, and float processing systems of the respective banks of first deposit designated the plurality of electronic return item notification files received thereby, wherein processing comprises at least one of error checking, and sorting, and retrieval of data from an electronic archive based on information in the electronic return item notification file; and
transmitting by the central processing systems after processing each of a plurality of the electronic return item notification files directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

6. The program product as defined in claim 5, further comprising programming for the first electronic processors to determine the central processor system based on at least one from the group of a table matching a bank of first deposit designated in the return item notification file to a given central processing system, a volume of return item notification files being processed and a location of a printer that services the bank of first deposit designated in the return item notification file.

7. The program product as defined in claim 5, further comprising program code for:
summing by the central processing system amounts from a plurality of return items for a designated bank of first deposit to obtain a sum for the designated bank of first deposit;
generating by the central processing system in advance of the designated bank of first deposit systems an electronic settlement document using the sum; and
sending by the central processing system the electronic settlement document directly or indirectly to the designated bank of first deposit with the electronic return item notification files.

8. The program product on a medium as defined in claim 5, further comprising program code for sending by the central processing system web content to a web client at a remote site to provide the electronic reproduction data for at least the front face of the return item or a link thereto.

9. A method for processing electronic return items, comprising:
in a network comprising a plurality of first electronic processors programmed to electronically receive electronic return item notification files from a plurality of payor banks, each electronic return item notification file including a data structure with a designated bank of first deposit and electronic reproduction data for at least an entire front face of the return item, each of the first electronic processors programmed at least for a sorting function, and a plurality of central processing systems, each of the central processing systems programmed to receive and process different electronic return item notification files received from a plurality of different first electronic processors in advance of and separate from magnetic ink character recognition (MICR) capture, deposit accounting, cash management, and float processing systems of the respective banks of first deposit designated in the different electronic return item notification files;

receiving electronically by each of a plurality of the first electronic processors a different plurality of electronic return item notification files from a different plurality of payor banks, wherein each of a plurality of the electronic return item notification files designates a different bank of first deposit;

processing by the first electronic processors the different electronic return item notification files received thereby;

determining by the first electronic processors based on at least one criterion, for each of a respective different plurality of the electronic return item notification files received thereby, at least one of the central processing systems from among the plurality of central processing systems at different locations to which to send the electronic return item notification file;

receiving electronically by each of a plurality of the central processing systems from one or more of the first electronic processors a different plurality from among the electronic return item notification files and from a plurality of the payor banks;

processing electronically by the respective central processing system in advance of the MICR capture, deposit accounting, cash management, and float processing systems of the respective banks of first deposit designated the plurality of electronic return item notification files received thereby, wherein processing comprises at least one of error checking, and sorting, and retrieval of data from an electronic archive based on information in the electronic return item notification file; and transmitting by the respective central processing systems after processing each of a plurality of the electronic return item notification files directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

10. The method as defined in claim 9, wherein the determining the central processor system step makes the determination based on at least one from the group of a table matching a bank of first deposit designated in the return item notification file to a given central processing system, a volume of return item notification files being processed and a location of a printer that services the bank of first deposit designated in the return item notification file.

11. The method as defined in claim 9, further comprising:
summing by the central processing system amounts from a plurality of return items for a designated bank of first deposit to obtain a sum for the designated bank of first deposit;
generating by the central processing system in advance of the designated bank of first deposit systems an electronic settlement document using the sum; and
sending by the central processing system the electronic settlement document directly or indirectly to the designated bank of first deposit with the electronic return item notification files.

12. A system for processing electronic return items, comprising:
a plurality of central processing systems, each of the central processing systems programmed to receive and process electronic return item notification files in advance of and separate from magnetic ink character recognition (MICR) capture, deposit accounting, cash management, and float processing systems of respective banks of first deposit designated in the different electronic return item notification files, each electronic return item notification file including a data structure with a designated bank of first deposit and electronic reproduction data for at least an entire front face of the return item, wherein the central processing systems are programmed to receive electronically a plurality of the electronic return item notification files directly or indirectly from a plurality of payor banks, wherein each of a plurality of the received electronic return notification files designates a different bank of first deposit, wherein each of the central processing systems are programmed to process in advance of the MICR capture, deposit accounting, cash management, and float processing systems of respective banks of first deposit designated the electronic return item notification files received thereby, wherein processing comprises at least one of error checking, and sorting, and retrieval of data from an electronic archive based on information in the electronic return item notification file; and a different transmitter associated with each of the different central processing systems for sending electronically each of a plurality of the electronic return item notification files received thereby directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

13. The system as defined in claim 12, further comprising:
the central processing systems programmed to add amounts from a plurality of return items for a designated bank of first deposit to obtain a sum for the designated bank of first deposit, generate in advance of the designated bank of first deposit systems an electronic settlement document using the sum, and send the electronic settlement document directly or indirectly to the designated bank of first deposit with the electronic return item notification files.

14. The system as defined in claim 12, further comprising the central processing system programmed to send web content to a web client at a remote site to provide the electronic reproduction data for at least the front face of the return item or a link thereto.

15. A program product for processing electronic return items, comprising:
at least one computer-readable medium having program code embodied therein or among them if more than one computer-readable medium, capable of causing, when executed, machines in a network comprising a plurality of central processing systems, each of the central processing systems programmed to receive and process and sort different electronic return item notification files received thereby from a plurality of different payor banks in advance of and separate from magnetic ink character recognition (MICR) capture, deposit accounting, cash management, and float processing systems of the respective banks of first deposit designated in the different electronic return item notification files, to perform the following method steps:

receiving electronically by a respective one of the central processing systems a plurality of the electronic return item notification files directly or indirectly from a plurality of payor banks, each electronic return item notification file including a data structure with a designated bank of first deposit and electronic reproduction data for at least an entire front face of the return item, wherein each of a plurality of the received electronic return notification files designates a different banks of first deposit;

processing electronically by the respective central processing system in advance of the MICR capture, deposit accounting, cash management, and float processing systems of respective banks of first deposit designated the electronic return item notification files received thereby, wherein processing comprises at least one of error checking, and sorting, and retrieval of data from an electronic archive based on information in the electronic return item notification file; and each of the different central processing systems sending electronically each of a plurality of the electronic return item notification files received thereby directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

16. The program product as defined in claim 15, further comprising program code for:

summing by the central processing system amounts from a plurality of return items for a designated bank of first deposit to obtain a sum for the designated bank of first deposit;

generating by the central processing system in advance of the designated bank of first deposit systems an electronic settlement document using the sum; and sending by the central processing system the electronic settlement document directly or indirectly to the designated bank of first deposit with the electronic return item notification files.

17. The program product as defined in claim 16, further comprising program code for sending by the central processing system web content to a web client at a remote site to provide the electronic reproduction data for at least the front face of the return item or a link thereto.

18. A method for processing electronic return items, comprising:

maintaining a plurality of central processing systems each of the central processing systems programmed to process electronic return item notification files in advance of and separate from magnetic ink character recognition (MICR) capture, deposit accounting, cash management, and float processing systems of respective banks of first deposit designated in the different electronic return item notification files, each electronic return item notification file including a data structure with a designated bank of first deposit and electronic reproduction data for at least an entire front face of the return item, wherein the central processing systems are programmed to receive electronically a plurality of the electronic return item notification files directly or indirectly from a plurality of payor banks;

receiving electronically by a respective one of the central processing systems a plurality of the electronic return item notification files directly or indirectly from a plurality of payor banks, wherein each of a plurality of the received electronic return notification files designates a different banks of first deposit;

processing electronically by the respective central processing system in advance of the MICR capture, deposit accounting, cash management, and float processing systems of respective banks of first deposit designated the electronic return item notification files received thereby, wherein processing comprises at least one of error checking, and sorting, and retrieval of data from an electronic archive based on information in the electronic return item notification file; and transmitting electronically by each of the respective different central processing systems each of a plurality of the electronic return item notification files received thereby directly or indirectly to the respective bank of first deposit designated in the respective electronic return item notification file, wherein for a plurality of the central processing systems some of the electronic return item notification files received thereby designate a different respective bank of first deposit and the respective central processing system is programmed to send each of the respective return notification files to the respective different bank of first deposit designated therein.

19. The method as defined in claim 18, further comprising:

summing by the central processing system amounts in a plurality of return items for a designated bank of first deposit to obtain a sum for the designated bank of first deposit;

generating by the central processing system in advance of the designated bank of first deposit systems an electronic settlement document using the sum; and sending by the central processing system the electronic settlement document directly or indirectly to the designated bank of first deposit with the electronic return item notification files.

20. The method as defined in claim 18, further comprising sending by the central processing system web content to a web client at a remote site to provide the electronic reproduction data for at least the front face of the return item or a link thereto.

* * * * *